(12) United States Patent
Chien et al.

(10) Patent No.: US 11,356,693 B2
(45) Date of Patent: Jun. 7, 2022

(54) MOTION VECTOR CODING FOR VIDEO CODING

(71) Applicant: QUALCOMM Incorporated, San Diego, CA (US)

(72) Inventors: Wei-Jung Chien, San Diego, CA (US); Jianle Chen, San Diego, CA (US); Li Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/582,939

(22) Filed: Sep. 25, 2019

(65) Prior Publication Data

US 2020/0029091 A1      Jan. 23, 2020

Related U.S. Application Data

(63) Continuation of application No. 15/718,725, filed on Sep. 28, 2017, now Pat. No. 10,462,462.

(60) Provisional application No. 62/401,692, filed on Sep. 29, 2016.

(51) Int. Cl.
| | |
|---|---|
| *H04N 19/513* | (2014.01) |
| *H04N 19/137* | (2014.01) |
| *H04N 19/176* | (2014.01) |
| *H04N 19/91* | (2014.01) |

(52) U.S. Cl.
CPC ......... *H04N 19/513* (2014.11); *H04N 19/137* (2014.11); *H04N 19/176* (2014.11); *H04N 19/91* (2014.11)

(58) Field of Classification Search
CPC .. H04N 19/513; H04N 19/137; H04N 19/176; H04N 19/91; H04N 19/52; H04N 19/70; H04N 19/139; H04N 19/103
See application file for complete search history.

(56) References Cited

U.S. PATENT DOCUMENTS

| | | | |
|---|---|---|---|
| 2007/0080832 A1 | 4/2007 | Yang et al. | |
| 2013/0170553 A1* | 7/2013 | Chen | H04N 19/50 375/240.16 |
| 2014/0010310 A1* | 1/2014 | Rapaka | H04N 19/59 375/240.17 |

(Continued)

OTHER PUBLICATIONS

An J., et al., "Progressive MV Resolution," 6th Meeting; 97. MPEG Meeting, Jul. 14, 2011-Jul. 22, 2011; Torino, IT (Joint Collaborative Team on Video Coding of ISO/IEC JTC1/SC29/WG11 and ITU-T SG.16); URL: http://wftp3.1tu.int/av-arch/jctvc-site/, No. JCTVC-F125, Jul. 1, 2011 (Jul. 1, 2011), pp. 1-14, XP030009148.

(Continued)

*Primary Examiner* — Richard T Torrente
(74) *Attorney, Agent, or Firm* — Shumaker & Sieffert, P.A.

(57) ABSTRACT

Coding a motion vector difference (MVD) during an inter-prediction process. Example techniques may include determining a particular coding and/or signaling method for an MVD from among two or more MVD coding and/or signaling techniques. A video coder (e.g., a video encoder and/or a video decoder) may determine a particular MVD coding and/or signaling technique based on characteristics of video data or coding methods, including MV precision, Picture Order Count (POC) difference, or any other already coded/decoded information of a block of video data.

8 Claims, 9 Drawing Sheets

(56) References Cited

U.S. PATENT DOCUMENTS

| | | | |
|---|---|---|---|
| 2014/0140400 A1* | 5/2014 | George | H04N 19/70 375/240.12 |
| 2014/0177707 A1 | 6/2014 | George et al. | |
| 2015/0195562 A1 | 7/2015 | Li et al. | |
| 2015/0382010 A1 | 12/2015 | Rapaka et al. | |
| 2018/0091816 A1 | 3/2018 | Chien et al. | |
| 2018/0220149 A1* | 8/2018 | Son | H04N 19/176 |
| 2019/0058896 A1* | 2/2019 | Huang | H04N 19/176 |

OTHER PUBLICATIONS

Chen, et al., "Enhanced Motion Vector Difference Coding," JVET Meeting; (The Joint Video Exploration Team of ISO/IEC JTC1/SC29/WG11 and ITU-T SG.16), 4th Meeting: Chengdu, CN, Oct. 15-21, 2016, No. JVET-D0123_v3, 3 pp.

Chen J., et al., "Algorithm description of Joint Exploration Test Model 3 (JEM3)", 3, JVET Meeting; 26-5-2016-1-6, 2016; Geneva; (The Joint Video Exploration Team of ISO/IEC JTC1/SC29/WG11 and ITU-T SG.16) URL: http://phenix.int-evry.fr/jvet/, No. JVET-C1001_v1,Jul. 2, 2016 (Jul. 2, 2016), XP030150223, 38 Pages.

Chiu Y-J., et al., "Decoder-side Motion Estimation and Wiener filter for HEVC", 2013 Visual Communications and Image Processing (VCIP), IEEE, Nov. 17, 2013 (Nov. 17, 2013), pp. 1-6, XP032543658, DOI: 10.1109/VCIP.2013.6706446 [retrieved on Jan. 8, 2014].

Guo L., et al., "Adaptive motion vector resolution with implicit signaling," Image Processing (ICIP), 2010 17th IEEE International Conference, Sep. 26-29, 2010, pp. 2057-2060.

International Search Report and Written Opinion—PCT/US2017/054399—ISA/EPO—dated Dec. 14, 2017.

"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9 6 on p. 102, section 8.5.3 2.6 on p. 141, section 8 5.3.2.7 on pp. 141-145, and section 8.5.3.2.8 on p. 145.

Kamp S., et al., "Decoder-Side Motion Vector Derivation for Block-Based Video Coding", IEEE transactions on circuits and systems for video technology, vol. 22, No. 12, 2012, pp. 1732-1745.

Second Written Opinion dated Jul. 25, 2018, from International Application No. PCT/US2017/054399, 8 pp.

Suehring K., et al., "JVET common test conditions and software reference configurations," Joint Video Exploration Team (JVET) of ITU-T SG16 WP3 and ISO/IEC JTC1/SC29/WG11, 2nd Meeting: San Diego, USA, Feb. 20-26, 2016, Document: JVET-B1010, 4 pages.

Sullivan G.J., "Consent: H.265 (V4) "High Efficiency Video Coding" (Rev.); TD 558 (PLEN/16)", ITU-T Draft ; Microsoft Corp USA, Study Period 2013-2016, International Telecommunication Union, Geneva, CH, vol. 6/16, May 31, 2016, XP044170101, pp. 1-702, Retrieved from the Internet: URL:https://www.itu.int/ifa/t/2013/sg16/docs/160523/td/plen/T13-SG16-160523-TD-PLEN-0558!!MSW-E.doc [retrieved on May 31, 2016].

Sze V., et al., "High Throughput CABAC Entropy Coding in HEVC", IEEE Transactions on Circuits and Systems for Video Technology, IEEE Service Center, Piscataway, NJ, US, vol. 22, No. 12, Dec. 1, 2012 (Dec. 1, 2012), pp. 1778-1791, XP011487151, ISSN: 1051-8215, DOI: 10 1109/TCSVT.2012.2221526.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2 6 on p. 125, section 8.5.3.2 7 on pp. 126-129, and section 8.5.3.2 8 on pp. 129 and 130.

Zhou Y., et al., "Motion Vector Resolution Control for Screen Content Coding", 16. JCT-VC Meeting; Sep. 1, 2014-Jan. 17, 2014; San Jose; (Joint Collaborative Team on Video Coding of ISO/IEC JTC1/SC29/WG11 and ITU-T SG.16) URL: http://wftp3.itu.int/av-arch/jctvc-site/, No. JCTVC-P0277, Jan. 9, 2014 (Jan. 9, 2014), pp. 1-5, XP030115825, abstract.

International Preliminary Report on Patentability from International Application No. PCT/US2017/054399, dated Oct. 31, 2018 24, pp.

Response to Written Opinion dated Dec. 14, 2017, from International Application No. PCT/US2017/054399, filed on Jun. 19, 2018, 24 pp.

ITU-T H.265, "Series H: Audiovisual and Multimedia Systems, Infrastructure of audiovisual services—Coding of moving video, High efficiency video coding," The International Telecommunication Union. Dec. 2016, 664 pp.

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Jun. 3, 2016, pp. 1-29.

* cited by examiner

MOTION VECTOR CODING FOR VIDEO CODING

This application is a continuation of U.S. application Ser. No. 15/718,725, filed Sep. 28, 2017, which claims the benefit of U.S. Provisional Application No. 62/401,692, filed Sep. 29, 2016, the entire content of both being incorporated by reference herein.

TECHNICAL FIELD

This disclosure relates to video coding and, more particularly, to inter-prediction video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

SUMMARY

In general, this disclosure describes techniques for coding a motion vector difference (MVD) during an inter-prediction process. Example techniques of the disclosure may include determining a particular coding and/or signaling method/technique for an MVD from among two or more MVD coding and/or signaling techniques. A video coder (e.g., a video encoder and/or a video decoder) may determine a particular MVD coding and/or signaling technique based on characteristics of video data or coding methods, including MV precision, Picture Order Count (POC) difference, or any other already coded/decoded information of a block of video data.

In one example of the disclosure, a method of decoding video data comprises receiving an encoded block of video data, receiving one or more syntax elements indicating a motion vector difference (MVD) associated with the encoded block of video data, determining an MVD coding technique from two or more MVD coding techniques, decoding the one or more syntax elements indicating the MVD using the determined MVD coding technique, and decoding the encoded block of video data using the decoded MVD.

In another example of the disclosure, an apparatus configured to decode video data comprises a memory configured to store an encoded block of video data, and one or more processors configured to receive the encoded block of video data, receive one or more syntax elements indicating an MVD associated with the encoded block of video data, determine an MVD coding technique from two or more MVD coding techniques, decode the one or more syntax elements indicating the MVD using the determined MVD coding technique, and decode the encoded block of video data using the decoded MVD.

In another example of the disclosure, an apparatus configured to decode video data comprises means for receiving an encoded block of video data, means for receiving one or more syntax elements indicating an MVD associated with the encoded block of video data, means for determining an MVD coding technique from two or more MVD coding techniques, means for decoding the one or more syntax elements indicating the MVD using the determined MVD coding technique, and means for decoding the encoded block of video data using the decoded MVD.

In another example, this disclosure describes a computer-readable storage medium storing instructions that, when executed, causes one or more processors of a device configured to decode video data to receive the encoded block of video data, receive one or more syntax elements indicating an MVD associated with the encoded block of video data, determine an MVD coding technique from two or more MVD coding techniques, decode the one or more syntax elements indicating the MVD using the determined MVD coding technique, and decode the encoded block of video data using the decoded MVD.

In another example of the disclosure, a method of encoding video data comprises encoding a block of video data according to an inter-prediction mode, determining an MVD associated with the block of video data, determining an MVD coding technique from two or more MVD coding techniques, and encoding one or more syntax elements indicating the MVD using the determined MVD coding technique.

The details of one or more examples are set forth in the accompanying drawings and the description below. Other features, objects, and advantages will be apparent from the description and drawings, and from the claims.

DETAILED DESCRIPTION

Figure 1:
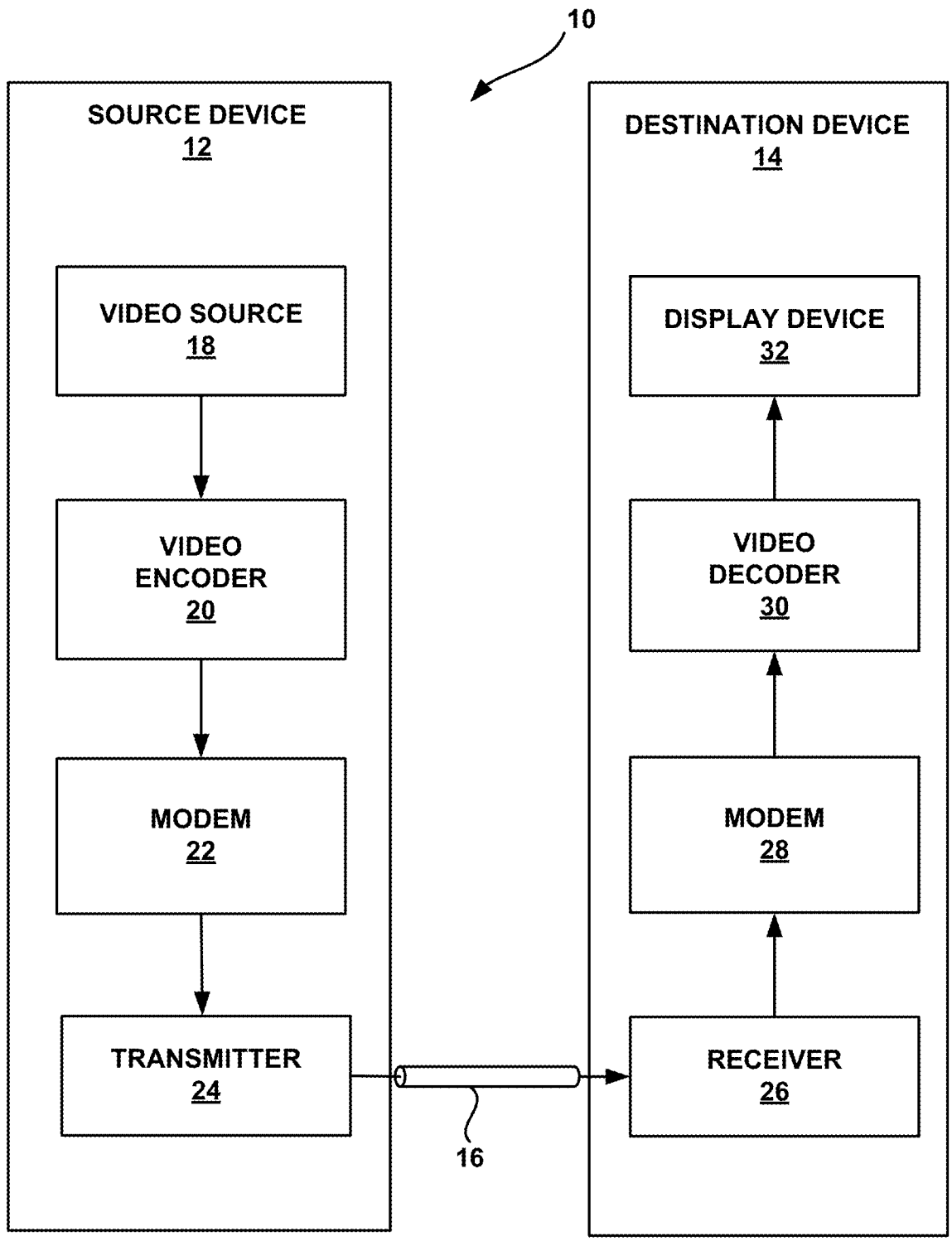
FIG. 1 is a block diagram illustrating an example video encoding and decoding system that may utilize the techniques of this disclosure.

This disclosure is related to techniques for motion vector (MV) coding, including techniques for the binarizing, encoding, signaling, and decoding of MV differences (MVD). The techniques described herein may be used in the context of advanced video codecs, such as extensions of HEVC or a next generation of video coding standard.

H.264 and H.265 video encoders and video decoders support motion vectors having one-quarter-pixel precision. In one-quarter-pixel precision, the difference between successive codeword values for an MV or an MVD is equal to one-quarter of the distance between pixels. Likewise, in one-eight-pixel prediction, the difference between successive codeword values for an MV or an MVD is equal to one-eighth of the distance between pixels. In integer pixel precision, the difference between successive codeword values for an MV or an MVD is equal to a full pixel in distance.

The pixel precision used is typically neither signaled nor derived, but instead, is fixed (e.g., preconfigured or predetermined). In some instances, one-eighth-pixel precision may provide certain advantages over one-quarter-pixel precision or integer pixel precision. However, encoding every motion vector to one-eighth-pixel precision may use a large number of coding bits, which may outweigh the benefits otherwise provided by one-eighth-pixel precision motion vectors. That is, the bitrate required to signal an MV or MVD at one-eighth-pixel precision may outweigh any distortion gains. For some types of video content, it may be preferable to code motion vectors without interpolation at all, in other words, using only integer pixel precision.

Screen content, such as the content generated by a computer (e.g., text or simple graphics), typically involves series of pixels that all have the exact same pixel values, followed by a sharp change in pixel values. For example, in screen content that includes blue text on a white background, the pixels forming a blue letter may all have the same pixel values, while the white background also all has the same pixel values, but the white pixel values may be significantly different than the blue pixel values. Camera acquired content (e.g., so-called natural images), by contrast, typically includes slow changes in pixel values due to motion, shadows, illumination changes, and other natural phenomena. As screen content and camera-acquired content typically have different characteristics, coding tools effective for one type of content may not necessarily be effective for the other type of content. As one example, sub-pixel interpolation for inter-prediction encoding may improve the coding of camera content, but the associated complexity and signaling overhead may actually reduce coding quality and/or bandwidth efficiency for screen content.

In some examples, the techniques of this disclosure may include adaptively determining motion vector precision based on, for example, the content (e.g., the type of content) of the video being coded. In some examples, the techniques of this disclosure may include deriving, by an encoder, an appropriate motion vector precision for the video content being coded. Using the same derivation techniques, a video decoder may also determine, without receiving a syntax element indicating the motion vector precision, what motion vector precision was used to encode the video data. In other examples, a video encoder may signal (and the video decoder may receive), in the encoded video bitstream, the motion vector precision selected by the video encoder.

Adaptively selecting motion vector precision may improve overall video coding quality by enabling higher precision motion vectors (e.g. $1/4^{th}$ or $1/8^{th}$ precision motion vectors) to be used for video content where the use of such higher precision motion vector improves video coding quality, for example, by producing a better rate-distortion tradeoff. Adaptively selecting motion vector precision may also improve overall video coding quality by enabling the use of lower precision motion vectors (e.g. integer precision) for video content where the use of higher precision motion vectors does not improve, or even worsens, video coding quality.

This disclosure also describes techniques related to MVD coding and/or signaling, including the determination of an MVD coding and/or signaling technique from among two or more MVD coding and/or signaling techniques. A video coder (e.g., a video encoder and/or a video decoder) may determine a particular MVD coding and/or signaling technique based on characteristics of video data or coding methods, including MV precision, POC difference, or any other already coded/decoded information of a block of video data.

Various techniques in this disclosure may be described with reference to a video coder, which is intended to be a generic term that can refer to either a video encoder or a video decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current layer, current block, current picture, current slice, etc. In the context of this disclosure, the term current is intended to identify a layer, block, picture, slice, etc. that is currently being coded, as opposed to, for example, previously coded layers, blocks, pictures, and slices or yet to be coded blocks, pictures, and slices.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

FIG. 1 is a block diagram illustrating an example video encoding and decoding system 10 that may utilize the techniques of this disclosure for coding MVs and/or MVDs. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless. The techniques of this disclosure, however, which generally concern techniques for supporting adaptive sub-pixel precision for motion vectors, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for supporting two or more techniques for coding and/or signaling MVs and/or MVDs. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques of this disclosure for coding and/or signaling MVs and/or MVDs may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between source devices 12 and destination device 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein for coding MVs and/or MVDs. The information communicated over channel 16 may include syntax information defined by video encoder 20, which is also used by video decoder 30, that includes syntax elements that describe characteristics and/or processing of macroblocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some examples, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. And the latest version of reference software, i.e., Joint Exploration Model 3 (JEM 3.0) could be downloaded from: https://jvet.hhi.fraunhofer.de/svn/svn_HMJEMSoftware/tags/HM-16.6-JEM-3.0/

An algorithm description of Joint Exploration Test Model 3 (JEM3) is described in J. Chen, et al., "Algorithm Description of Joint Exploration Test Model 3," Joint Video Exploration Team (JVET) of ITU-T SG 16 WP 3 and ISO/IEC JTC 1/SC 29/WG 11, 3rd Meeting: Geneva, CH, 26 May-1 Jun. 2016, JVET-C 1001.

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. For H.264, a video block may correspond to a macroblock or a partition of a macroblock. The video blocks may have fixed or varying sizes, and may differ in size according to a specified coding standard. Each video frame may include a plurality of slices. Each slice may include a plurality of macroblocks, which may be arranged into partitions, also referred to as sub-blocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" may refer to any independently decodable unit of a video frame such as an entire frame, a slice of a frame, a group of pictures (GOP), also referred to as a sequence, or another independently decodable unit defined according to applicable coding techniques.

A new video coding standard, referred to as High Efficiency Video Coding (HEVC), has recently been finalized. Extensions to HEVC include the Screen Content Coding extension. The HEVC standardization efforts were based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-three intra-prediction encoding modes.

HM refers to a block of video data as a coding unit (CU). Syntax data within a bitstream may define a largest coding unit (LCU, also called a coding tree unit (CTU)), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, PU, or TU. Moreover, where this disclosure refers to examples involving a coding unit or CU, it should be understood that other examples may be provided with respect to macroblocks substituted for coding units.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split (e.g., corresponding to a leaf node in the quadtree data structure) may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., integer pixel precision, one-quarter pixel precision, one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, a video encoder may calculate a residual value for the portion of the CU corresponding to the PU. The residual value may be transformed, quantized, and scanned. A TU is not necessarily limited to the size of a PU. Thus, TUs may be larger or smaller than corresponding PUs for the same CU. In some examples, the maximum size of a TU may correspond to the size of the CU that includes the TU.

Coding a PU using inter-prediction involves calculating a motion vector between a current block and a block in a reference frame. Motion vectors are calculated through a process called motion estimation (or motion search). A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice. In some examples, the reference sample may occur at a fractional pixel position. Upon finding a portion of the reference frame that best matches the current portion, the encoder determines the current motion vector for the current portion as the difference in the location from the current portion to the matching portion in the reference frame (i.e., from the center of the current portion to the center of the matching portion).

In some examples, video encoder 20 may signal the motion vector for each portion in the encoded video bitstream. The signaled motion vector is used by video decoder 30 to perform motion compensation in order to decode the video data. However, signaling the original motion vector directly may result in less efficient coding, as a large number of bits are typically needed to convey the information.

In some examples, rather than directly signaling the original motion vector, video encoder 20 may predict a motion vector for each partition or video block (e.g., for each PU in HEVC). In performing this motion vector prediction, video encoder 20 may select a set of candidate motion vectors determined from spatially neighboring blocks in the same frame as the current portion or a candidate motion vector determined from a co-located block in a reference frame (e.g., a temporal motion vector predictor (MVP)). Video encoder 20 may perform motion vector prediction, and if needed, signal the prediction difference (also called motion vector difference (MVD)), rather than signal an original motion vector, to reduce bit rate in signaling. The candidate motion vector vectors from the spatially neighboring blocks may be referred to as spatial MVP candidates, whereas the candidate motion vector from the co-located block in another reference frame may be referred to as temporal MVP candidate.

Two different modes or types of motion vector prediction are used in the HEVC standard. One mode is referred to as a "merge" mode. The other mode is referred to as advanced motion vector prediction (AMVP). In merge mode, video encoder 20 instructs video decoder 30, through bitstream signaling of prediction syntax, to copy a motion vector, reference index (identifying a reference frame, in a given reference picture list, to which the motion vector points) and the motion prediction direction (which identifies the reference picture list (List 0 or List 1), i.e., in terms of whether the reference frame temporally precedes or follows the currently frame) from a selected candidate motion vector for a current portion of the frame. This is accomplished by signaling in the bitstream an index into a candidate motion vector list identifying the selected candidate motion vector (i.e., the particular spatial MVP candidate or temporal MVP candidate). Thus, for merge mode, the prediction syntax may include a flag identifying the mode (in this case "merge" mode) and an index identifying the selected candidate motion vector. In some instances, the candidate motion vector will be in a causal portion in reference to the current portion. That is, the candidate motion vector will have already been decoded by video decoder 30. As such, video decoder 30 has already received and/or determined the motion vector, reference index, and motion prediction direction for the causal portion. As such, the decoder may simply retrieve the motion vector, reference index, and motion prediction direction associated with the causal portion from memory and copy these values as the motion information for the current portion. To reconstruct a block in merge mode, the decoder obtains the predictive block using the derived motion information for the current portion, and adds the residual data to the predictive block to reconstruct the coded block.

In AMVP, video encoder 20 instructs video decoder 30, through bitstream signaling, to only copy the motion vector from the candidate portion and use the copied vector as a predictor for motion vector of the current portion. Video encoder 20 also encodes and signals an MVD to video decoder 30 along with the reference index of the reference frame for motion vector predictor the prediction direction associated with the motion vector predictor of the current block. An MVD is the difference between the current motion vector for the current block and a motion vector predictor derived from a candidate block. In this case, video encoder 20, using motion estimation, determines an actual motion vector for the block to be coded, and then determines the difference between the actual motion vector and the motion vector predictor as the MVD value. In this way, video decoder 30 does not use an exact copy of the candidate motion vector as the current motion vector, as in the merge mode, but may rather use a candidate motion vector that may be "close" in value to the current motion vector determined from motion estimation and add the MVD to reproduce the current motion vector. To reconstruct a block in AMVP mode, video decoder 30 adds the corresponding residual data to the block pointed to by the current motion vector to reconstruct the coded block.

In most circumstances, the MVD requires fewer bits to signal than the entire current motion vector. As such, AMVP allows for more precise signaling of the current motion vector while maintaining coding efficiency over sending the whole motion vector. In contrast, the merge mode does not allow for the specification of an MVD, and as such, merge mode sacrifices accuracy of motion vector signaling for increased signaling efficiency (i.e., fewer bits). The prediction syntax for AMVP may include a flag for the mode (in this case AMVP flag), the index for the candidate block, the MVD between the current motion vector and the predictive motion vector from the candidate block, the reference index, and the motion prediction direction.

In accordance with example techniques of this disclosure, video encoder 20 may inter-mode encode a CU (e.g., using inter-prediction) using one or more PUs having motion vectors of varying sub-integer and/or integer pixel precision. For example, video encoder 20 may select between using a motion vector having integer pixel precision or fractional (e.g. one-fourth or one-eighth) pixel precision for a PU based on the content of the video data being encoded. According to some techniques of this disclosure, video encoder 20 may not need to generate, for inclusion in the bitstream of encoded video data, an indication of the sub-pixel precision for a motion vector of a PU. Instead, video decoder 30 may derive the motion vector precision using the same derivation techniques used by video encoder 20. According to other techniques of this disclosure, video encoder 20 may include, in the bitstream of encoded video data, one or more syntax elements that video decoder 30 may use to determine the selected motion vector precision.

To calculate values for sub-integer pixel positions (e.g., when performing inter-prediction), video encoder 20 may include a variety of interpolation filters. For example, bilinear interpolation may be used to calculate values for sub-integer pixel positions. Video encoder 20 may be configured to perform a motion search with respect to luminance data of a PU to calculate a motion vector using the luminance data of the PU. Video encoder 20 may then reuse the motion vector to encode chrominance data of the PU. Typically, chrominance data has a lower resolution than corresponding luminance data, e.g., one-quarter of the resolution of luminance data. Therefore, the motion vector for chrominance data may have a higher precision than for luminance data. For example, video encoder 20 and video decoder 30 may use one-quarter pixel precision motion vectors (and calculated MVDs) for luminance data, and may use one-eighth pixel precision for chrominance data. Similarly, video encoder 20 and video decoder 30 may use one-eighth pixel precision motion vectors for luminance data, and may use one-sixteenth pixel precision for chrominance data.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, LCU size, or the like.

According to the techniques of the disclosure described in more detail below, video encoder 20 and/or video decoder 30 may be configured to determine an MVD coding technique from two or more MVD coding techniques, and code an MVD for a block of video data using the determined MVD coding technique. In some examples, video encoder 20 and video decoder 30 may be configured to determine an MVD coding techniques based on the MVD precision used, the POC distance of the reference frame, both the MVD precision and POC distance, and/or other video coding characteristics. The techniques of this disclosure are generally described in reference to coding MVDs. However, the techniques of this disclosure may also be applied to video coding systems that signal entire motion vectors as well.

Video decoder 30 of destination device 14 may be configured to perform techniques similar, and generally symmetric, to any or all of the techniques of video encoder 20 of this disclosure.

Figure 2:
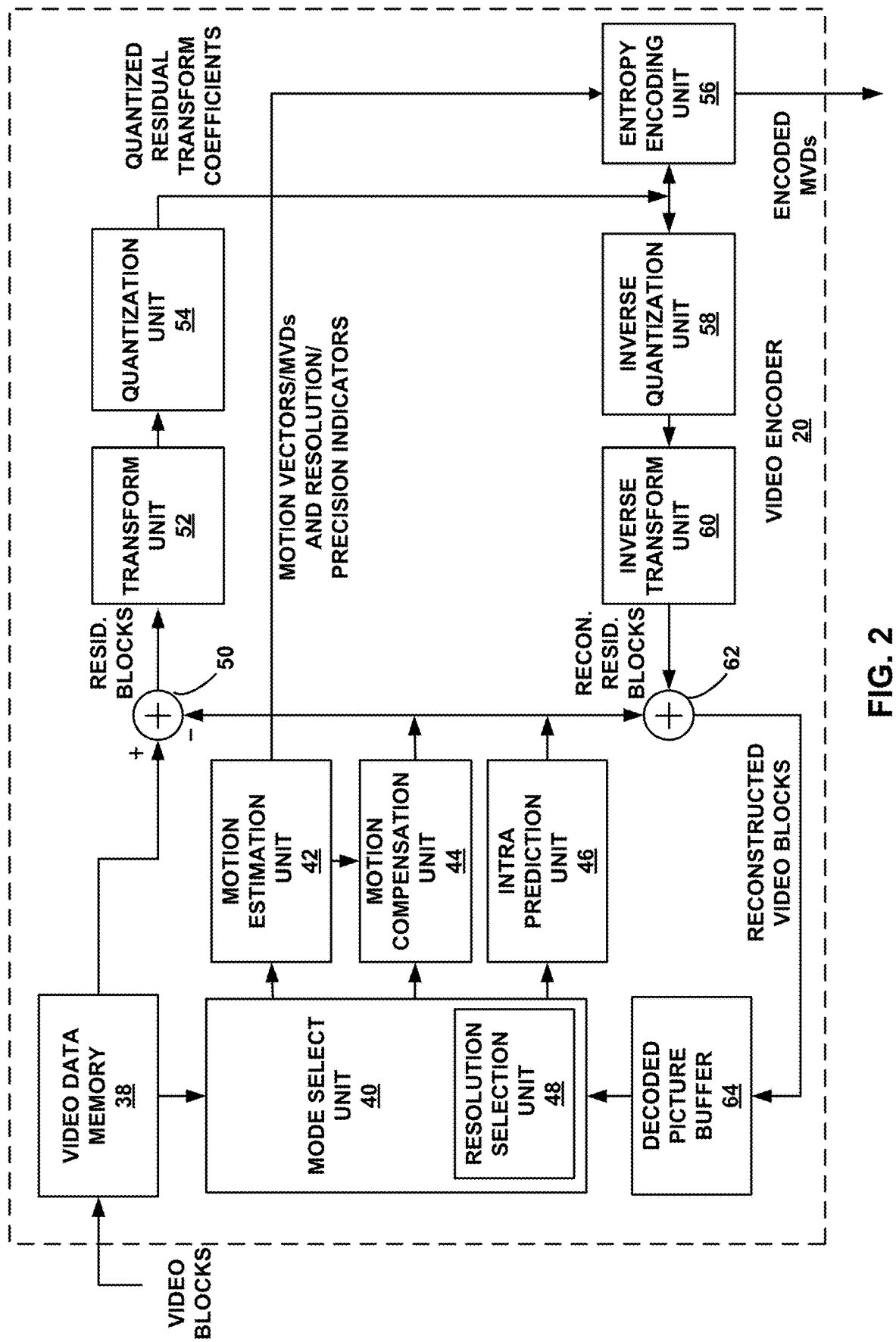
FIG. 2 is a block diagram illustrating an example of a video encoder that may be configured to implement the techniques of this disclosure.

FIG. 2 is a block diagram illustrating an example of video encoder 20 that may implement techniques for coding and/or signaling MVDs. Video encoder 20 may perform intra- and inter-prediction of blocks within video frames, including LCUs, CUs, and PUs, and calculate residual values that may be encoded as TUs. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes. Motion estimation unit 42 and motion compensation unit 44 may perform inter-prediction coding, while intra-prediction unit 46 may perform intra-prediction coding.

As shown in FIG. 2, video encoder 20 receives a current video block within a video frame to be encoded. In the example of FIG. 2, video encoder 20 includes video data memory 38, motion compensation unit 44, motion estimation unit 42, intra-prediction unit 46, decoded picture buffer 64, summer 50, transform unit 52, quantization unit 54, and entropy encoding unit 56. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

Video data memory 38 may store video data to be encoded by the components of video encoder 20. The video data stored in video data memory 38 may be obtained, for example, from video source 18. Decoded picture buffer 64 may be a reference picture memory that stores reference video data for use in encoding video data by video encoder 20, e.g., in intra- or inter-coding modes. Video data memory 38 and decoded picture buffer 64 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 38 and decoded picture buffer 64 may be provided by the same memory device or separate memory devices. In various examples, video data memory 38 may be on-chip with other components of video encoder 20, or off-chip relative to those components.

During the encoding process, video encoder 20 receives a video frame or slice to be coded. The frame or slice may be divided into multiple video blocks (e.g., LCUs). Motion estimation unit 42 and motion compensation unit 44 perform inter-predictive coding of the received video block relative to one or more blocks in one or more reference frames to provide temporal compression. Intra-prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. When mode select unit 40 selects inter-mode encoding for a block, resolution selection unit 48 may select a resolution for a motion vector (e.g., a sub-pixel or integer pixel precision) for the block. For example, resolution selection unit 48 may select one-eighth-pixel precision or one-quarter-pixel precision for a motion vector and MVD for the block.

As an example, resolution selection unit 48 may be configured to compare an error difference (e.g., the difference between a reconstructed block and the original block) between using a one-quarter-pixel precision motion vector to encode a block and using a one-eighth-pixel precision motion vector to encode the block. Motion estimation unit 42 may be configured to encode a block using one or more quarter-pixel precision motion vectors in a first coding pass and one or more eighth-pixel precision motion vectors in a second coding pass. Motion estimation unit 42 may further use a variety of combinations of one or more quarter-pixel precision motion vectors and one or more eighth-pixel precision motion vectors for the block in a third encoding pass. Resolution selection unit 48 may calculate rate-distortion values for each encoding pass of the block and calculate differences between the rate-distortion values.

When the difference exceeds a threshold, resolution selection unit 48 may select the one-eighth-pixel precision motion vector for encoding the block. Resolution selection unit 48 may also evaluate rate-distortion information, analyze a bit budget, and/or analyze other factors to determine whether to use one-eighth-pixel precision or one-quarter-pixel precision for a motion vector when encoding a block during an inter-mode prediction process. After selecting one-eighth-pixel precision or one-quarter-pixel precision for a block to be inter-mode encoded, mode select unit 40 or motion estimation may send a message (e.g., a signal) to motion estimation unit 42 indicative of the selected precision for a motion vector.

In addition, according to the techniques of the disclosure described in more detail below, video encoder 20 may be configured to determine an MVD coding technique from two or more MVD coding techniques, and code an MVD for a block of video data using the determined MVD coding technique. As will discussed in more detail below, video encoder 20 may determine a particular MVD coding and/or signaling technique based on characteristics of video data or coding methods, including MV precision, POC difference, or any other already coded/decoded information of a block of video data.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in decoded picture buffer 64. Motion compensation unit 44 may also interpolate sub-integer pixels of the reference frame, e.g., an I-frame or a P-frame. The ITU H.264 standard, as an example, describes two lists: list 0, which includes reference frames having a display order earlier than a current frame being encoded, and list 1, which includes reference frames having a display order later than the current frame being encoded. Therefore, data stored in decoded picture buffer 64 may be organized according to these lists.

In some examples, motion compensation unit 44 may be configured to interpolate values for one-sixteenth pixel positions of chrominance data of a CU when a motion vector for luminance data of the CU has one-eighth pixel precision. To interpolate values for the one-sixteenth pixel positions of the chrominance data, motion compensation unit 44 may utilize bilinear interpolation. Therefore, summer 50 may calculate a residual for the chrominance data of the CU relative to bilinear interpolated values of one-sixteenth pixel positions of a reference block. In this manner, video encoder 20 may calculate, using bilinear interpolation, values of one-sixteenth pixel positions of chrominance data of a reference block identified by a motion vector and encode chrominance data of a coding unit based on the bilinear interpolated values of the reference block, when luminance data of the coding unit was encoded using a motion vector having one-eighth pixel precision for the luminance data.

Motion estimation unit 42 compares blocks of one or more reference frames from decoded picture buffer 64 to a block to be encoded of a current frame, e.g., a P-frame or a B-frame. When the reference frames in decoded picture buffer 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in decoded picture buffer 64 if no values for sub-integer pixel positions are stored in decoded picture buffer 64. Motion estimation unit 42 sends the calculated motion vector to entropy encoding unit 56 and motion compensation unit 44. The reference frame block identified by a motion vector may be referred to as a predictive block.

Motion estimation unit 42, motion compensation unit 44, mode select unit 40, or another unit of video encoder 20, may also signal the use of a pixel precision (e.g., an integer pixel precision, one-quarter-pixel precision, one-eighth-pixel precision or other) for a motion vector used to encode a block. For example, motion estimation unit 42 may send an indication (e.g., a precision indicator using one or more syntax elements) of an integer or sub-integer pixel precision for the motion vector to entropy encoding unit 56. Motion estimation unit 42 may also provide context information relating to size information for a PU corresponding to the motion vector to entropy encoding unit 56, where the size information may include any or all of a depth of a CU including the PU, a size of the PU, and/or a type for the PU.

Motion compensation unit 44 may calculate prediction data based on the predictive block. Video encoder 20 forms a residual video block by subtracting the prediction data from motion compensation unit 44 from the original video block being coded. Summer 50 represents the component or components that perform this subtraction operation. Transform unit 52 applies a transform, such as a discrete cosine transform (DCT) or a conceptually similar transform, to the residual block, producing a video block comprising residual transform coefficient values.

Transform unit 52 may perform other transforms, such as those defined by the H.264 standard, which are conceptually similar to DCT. Wavelet transforms, integer transforms, sub-band transforms or other types of transforms could also be used. In any case, transform unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform content CAVLC, CABAC, or another entropy coding technique. Following the entropy coding by entropy encoding unit 56, the encoded video may be transmitted to another device or archived for later transmission or retrieval. In the case of context adaptive binary arithmetic coding, context may be based on neighboring macroblocks.

In some cases, entropy encoding unit 56 or another unit of video encoder 20 may be configured to perform other coding functions, in addition to entropy coding. For example, entropy encoding unit 56 may be configured to determine the CBP values for the macroblocks and partitions. Also, in some cases, entropy encoding unit 56 may perform run length coding of the coefficients in a macroblock or partition thereof. In particular, entropy encoding unit 56 may apply a zig-zag scan or other scan pattern to scan the transform coefficients in a macroblock or partition and encode runs of zeros for further compression. Entropy encoding unit 56 also may construct header information with appropriate syntax elements for transmission in the encoded video bitstream.

In accordance with the techniques of this disclosure, in instances where the sub-pixel precision is signaled rather than derived, entropy encoding unit 56 may be configured to encode an indication of a sub-pixel precision for a motion vector, e.g., to indicate whether the motion vector has integer-pixel precision or has sub-pixel precision, such as one-quarter pixel precision or one-eighth pixel precision (or other sub-pixel precisions, in various examples). Entropy encoding unit 56 may encode the indication using CABAC. Furthermore, entropy encoding unit 56 may use context information for performing CABAC to encode the indication that indicates size information for a PU corresponding to the motion vector, where the size information may include any or all of a depth of a CU including the PU, a size of the PU, and/or a type for the PU.

As discussed above, video encoder 20 may predictively signal the motion vector. Two examples of predictive signaling techniques that may be implemented by video encoder 20 include AMVP and merge mode signaling. In AMVP, video encoder 20 and video decoder 30 both assemble candidate lists based on motion vectors determined from already coded blocks. Video encoder 20 then signals an index into the candidate list to identify a motion vector predictor (MVP) and signals an MVD. As will be discussed in more detail below, video encoder 20 (e.g., through entropy encoding unit 56) may binarize and context encode (e.g., using CABAC) syntax elements that represent the MVD. Video decoder 30 inter predicts a block using the MVP as modified by the MVD, e.g. using a motion vector equal to MVP+MVD.

In merge mode, video encoder 20 and video decoder 30 both assemble a candidate list based on already coded blocks, and video encoder 20 signals an index for one of the candidates in the candidate list. In merge mode, video decoder 30 inter predicts the current block using the motion vector and the reference picture index of the signaled candidate. In both AMVP and merge mode, video encoder 20 and video decoder 30 utilize the same list construction techniques, such that the list used by video encoder 20 when determining how to encode a block matches the list used by video decoder 30 when determining how to decode the block.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of decoded picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent video frame.

Figure 3:
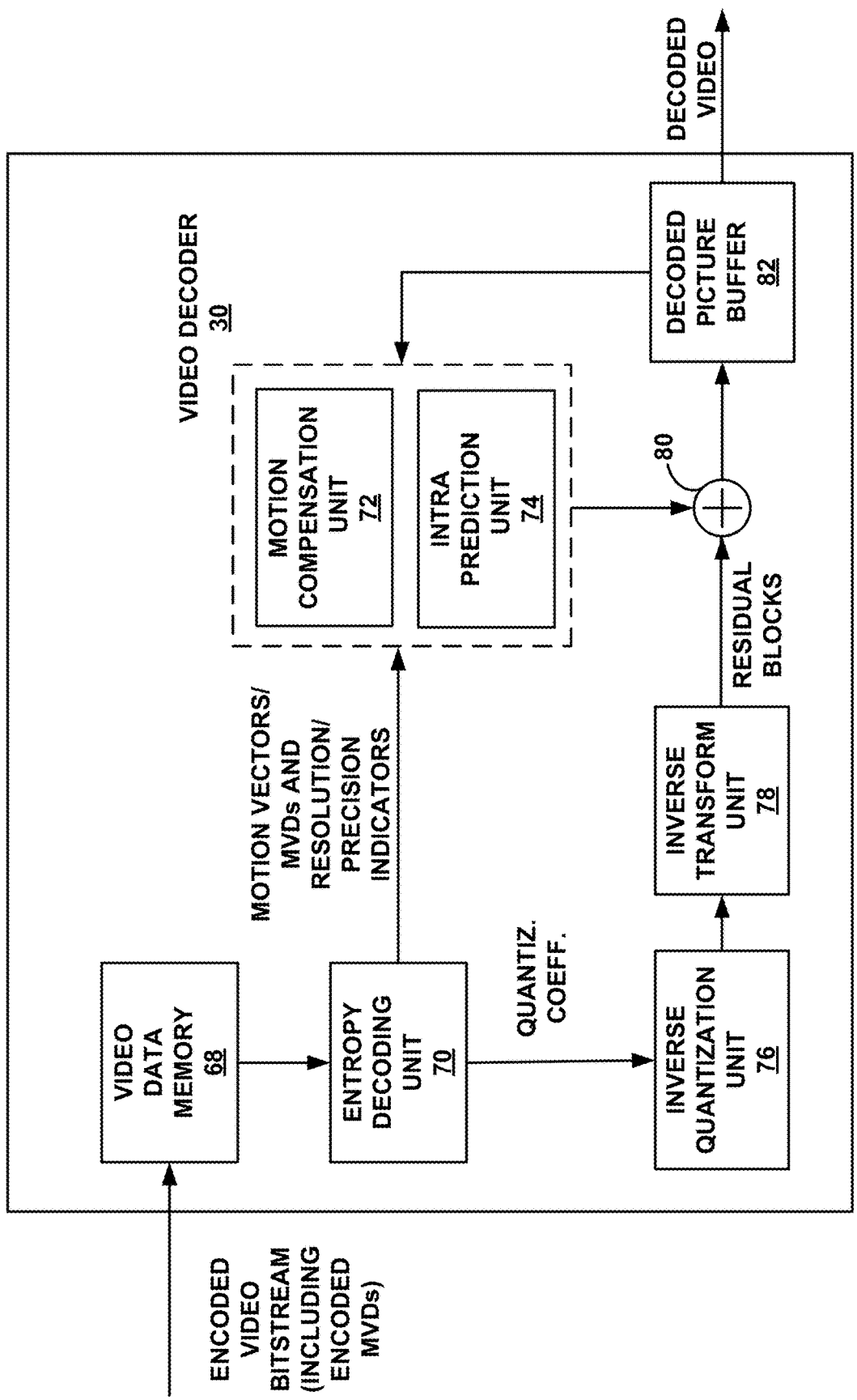
FIG. 3 is a block diagram illustrating an example of a video decoder that may be configured to implement techniques of this disclosure.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transformation unit 78, decoded picture buffer 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

Video data memory 68 may store video data, such as an encoded video bitstream, to be decoded by the components of video decoder 30. The video data stored in video data memory 68 may be obtained, for example, from communication channel 16, e.g., from a local video source, such as a camera, via wired or wireless network communication of video data, or by accessing physical data storage media. Video data memory 68 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 68 and decoded picture buffer 82 may be formed by any of a variety of memory devices, such as DRAM, including synchronous SDRAM, MRAM, RRAM, or other types of memory devices. Video data memory 68 and decoded picture buffer 82 may be provided by the same memory device or separate memory devices. In various examples, video data memory 68 may be on-chip with other components of video decoder 30, or off-chip relative to those components.

Entropy decoding unit 70 may retrieve an encoded bitstream, for example, from video data memory 68. The encoded bitstream may include entropy coded video data (e.g., encoded blocks of video data). Entropy decoding unit 70 may decode the entropy coded video data, and from the entropy decoded video data, motion compensation unit 72 may determine motion information, including motion vectors, motion vector precision, reference picture list indexes, and other motion information. Motion compensation unit 72 may, for example, determine such information by performing the AMVP and merge mode techniques described above.

Motion compensation unit 72 may use motion vectors and/or MVDs received in the bitstream to identify a prediction block in reference frames in decoded picture buffer 82. The precision used for encoding motion vectors and/or MVDs may be defined by precision indicators (e.g., one or more syntax elements) that are decoded by entropy decoding unit 70. Intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by video encoder 20 for each macroblock to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements.

Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks. In accordance with the techniques of this disclosure, motion compensation unit 72 may interpolate values of one-sixteenth pixel positions of chrominance data of a reference block when a motion vector has one-eighth pixel precision for luminance data. For example, motion compensation unit 72 may use bilinear interpolation to interpolate the values of the one-sixteenth pixel positions of the reference block.

Motion compensation unit 72 uses some of the syntax information to determine sizes of LCUs and CUs used to encode frame(s) and/or slice(s) of the encoded video sequence, partition information that describes how each macroblock of a frame of the encoded video sequence is partitioned, modes indicating how each partition is encoded, one or more reference frames (and reference frame lists) for each inter-encoded CU, and other information to decode the encoded video sequence.

According to the techniques of the disclosure described in more detail below, video decoder 30 may be configured to determine an MVD coding technique from two or more MVD coding techniques, and decode an MVD for a block of video data using the determined MVD coding technique. Video decoder 30 may determine a particular MVD decoding and/or signaling technique based on characteristics of video data or coding methods, including MV precision, POC difference, or any other already coded/decoded information of a block of video data.

Summer 80 sums the residual blocks with the corresponding prediction blocks generated by motion compensation unit 72 or intra-prediction unit to form decoded blocks. If desired, a deblocking filter may also be applied to filter the decoded blocks in order to remove blockiness artifacts. The decoded video blocks are then stored in decoded picture buffer 82, which provides reference blocks for subsequent motion compensation and also produces decoded video for presentation on a display device (such as display device 32 of FIG. 1).

Figure 4:
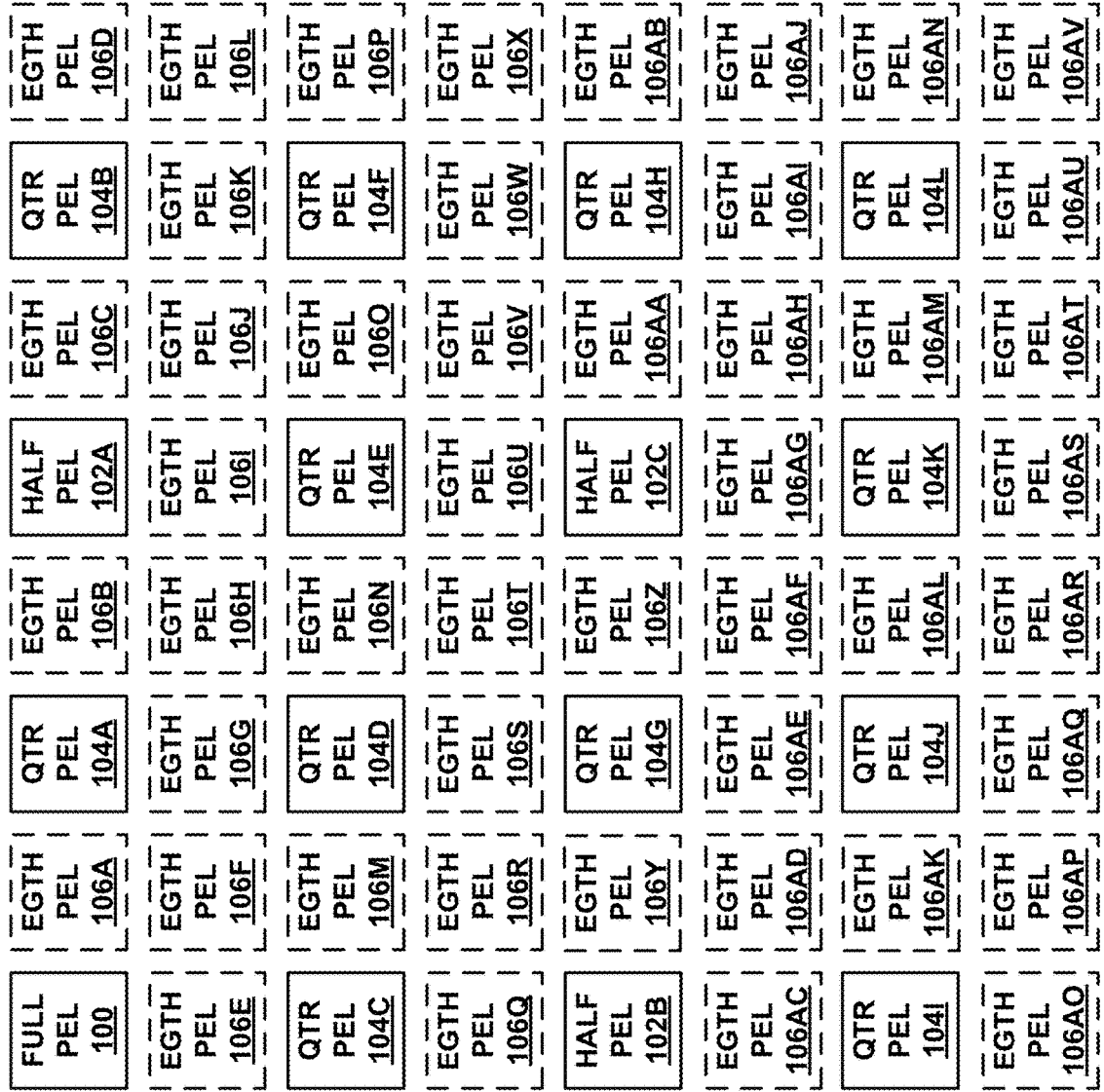
FIG. 4 is a conceptual diagram illustrating fractional pixel positions for a full pixel position.

FIG. 4 is a conceptual diagram illustrating fractional pixel positions for a full pixel position. In particular, FIG. 4 illustrates fractional pixel positions for full pixel (pel) 100. Full pixel 100 corresponds to half-pixel positions 102A-102C (half pels 102), quarter pixel positions 104A-104L (quarter pels 104), and one-eighth-pixel positions 106A-106AV (eighth pels 106).

FIG. 4 illustrates eighth pixel positions 106 of a block using dashed outlining to indicate that these positions may be optionally included. That is, if a motion vector (e.g., as reconstructed from an MVD of the same precision) has one-eighth-pixel precision, the motion vector may point to any of full pixel position 100, half pixel positions 102, quarter pixel positions 104, or eighth pixel positions 106. However, if the motion vector has one-quarter-pixel precision, the motion vector may point to any of full pixel position 100, half pixel positions 102, or quarter pixel positions 104, but would not point to eighth pixel positions 106. It should further be understood that in other examples, other precisions may be used, e.g., one-sixteenth pixel precision, one-thirty-second pixel precision, or the like.

A value for the pixel at full pixel position 100 may be included in a corresponding reference frame. That is, the value for the pixel at full pixel position 100 generally corresponds to the actual value of a pixel in the reference frame, e.g., that is ultimately rendered and displayed when the reference frame is displayed. Values for half-pixel positions 102, quarter-pixel positions 104, and eighth-pixel positions 106 (collectively referred to as fractional pixel positions) may be interpolated using adaptive interpolation filters or fixed interpolation filters, e.g., filters of various numbers of "taps" (coefficients) such as various Wiener filters, bilinear filters, or other filters. In general, the value of a fractional pixel position may be interpolated from one or more neighboring pixels, which correspond to values of neighboring full pixel positions or previously determined fractional pixel positions.

In some examples of this disclosure, video encoder 20 may adaptively select precision for a motion vector and/or MVD, e.g., between integer pixel precision or fractional pixel precision such as one-eighth pixel precision and one-quarter pixel precision. Video encoder 20 may make this selection for each motion vector, each CU, each LCU, each slice, each frame, each GOP, or other coded units of video data. When video encoder 20 selects one-quarter pixel precision for a motion vector, the motion vector may refer to any of full pixel position 100, half pixel positions 102, or quarter pixel positions 104. When video encoder 20 selects one-eighth pixel precision for a motion vector, the motion vector may refer to any of full pixel position 100, half pixel positions 102, quarter pixel positions 104, or eighth pixel positions 106.

Figure 5A:
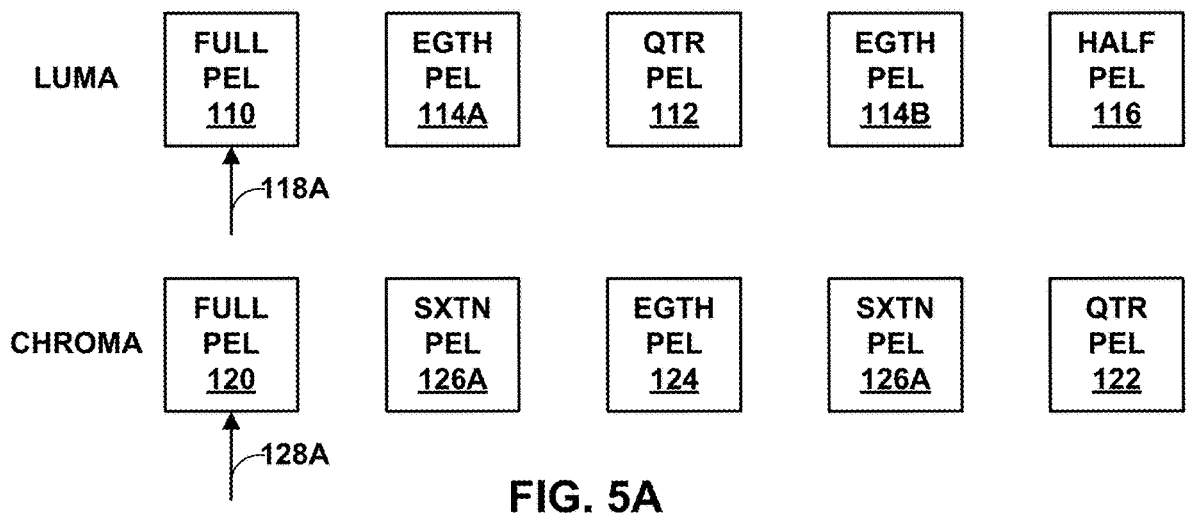
FIGS. 5A-5C are conceptual diagrams illustrating corresponding chrominance and luminance pixel positions.
Figure 5B:
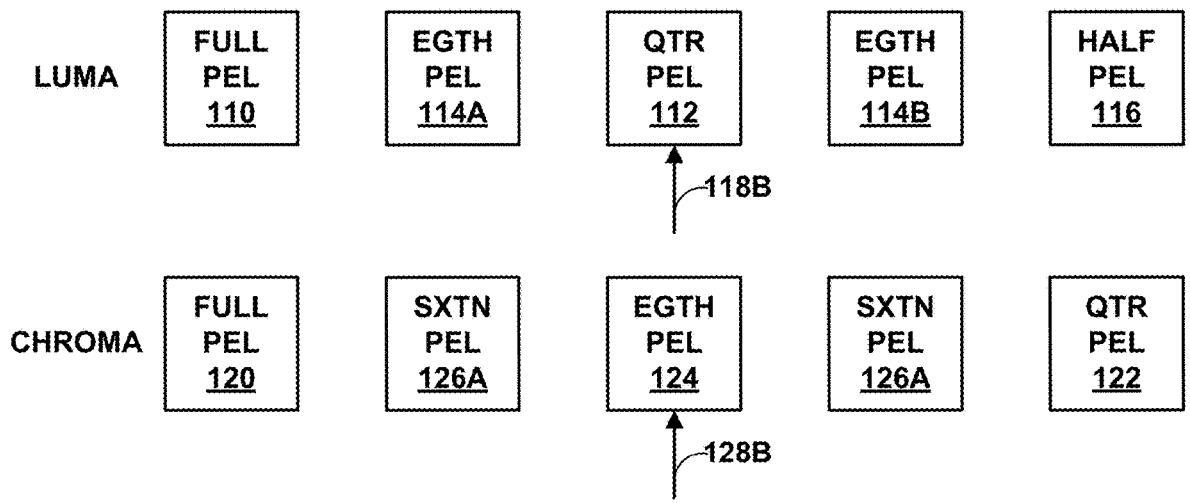
Figure 5C:
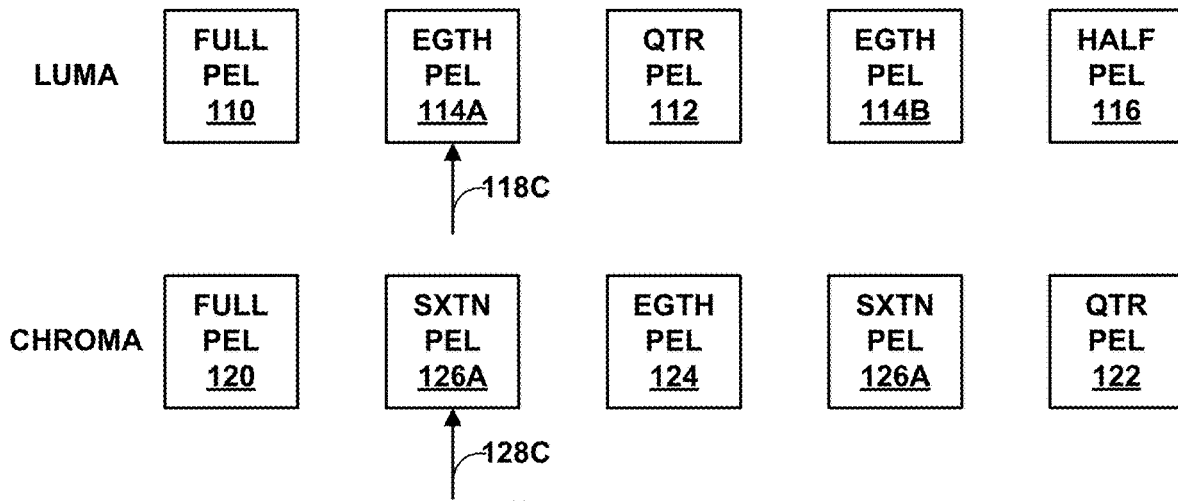

FIGS. 5A-5C are conceptual diagrams illustrating corresponding chrominance and luminance pixel positions. FIGS. 5A-5C also illustrate how motion vectors calculated for luminance data may be reused for chrominance data. As a preliminary matter, FIGS. 5A-5C illustrate a partial row of pixel positions. It should be understood that in practice, a full pixel position may have a rectangular grid of associated fractional pixel positions, such as that illustrated in FIG. 4. The example of FIGS. 5A-5C are intended to illustrate the concepts described in this disclosure, and are not intended as an exhaustive listing of correspondences between fractional chrominance pixel positions and fractional luminance pixel positions.

FIGS. 5A-5C illustrate pixel positions of a luminance block, including full luminance pixel position 110, half luminance pixel position 116, quarter pixel position 112, and eighth luminance pixel positions 114A, 114B. FIGS. 5A-5C also illustrate corresponding pixel positions of a chrominance block, including full chrominance pixel position 120, quarter chrominance pixel position 122, eighth chrominance pixel position 124, and sixteenth chrominance pixel positions 126A, 126B. In this example, full chrominance pixel 120 corresponds to full luminance pixel 110. Further, in this example, the chrominance block is downsampled by a factor of two horizontally and vertically relative to the luminance block. Thus, quarter chrominance pixel 122 corresponds to half luminance pixel 116. Similarly, eighth chrominance pixel 124 corresponds to quarter luminance pixel 112, sixteenth chrominance pixel 126A corresponds to eighth luminance pixel 114A, and sixteenth chrominance pixel 126B corresponds to eighth luminance pixel 114B.

In advanced video codecs, such as H.264/AVC, HEVC, and potentially the successor codecs to H.264 and HEVC, the bit cost of signaling motion vectors may increase. To lower this bit cost, decoder side MV derivation (DMVD) may be used. In S. Kamp and M. Wien, "Decoder-side motion vector derivation for block-based video coding," *IEEE Transactions on Circuits and Systems for Video Technology*, vol. 22, pp. 1732-1745, December 2012, DMVD was proposed based on an L-shape template matching.

Figure 6:
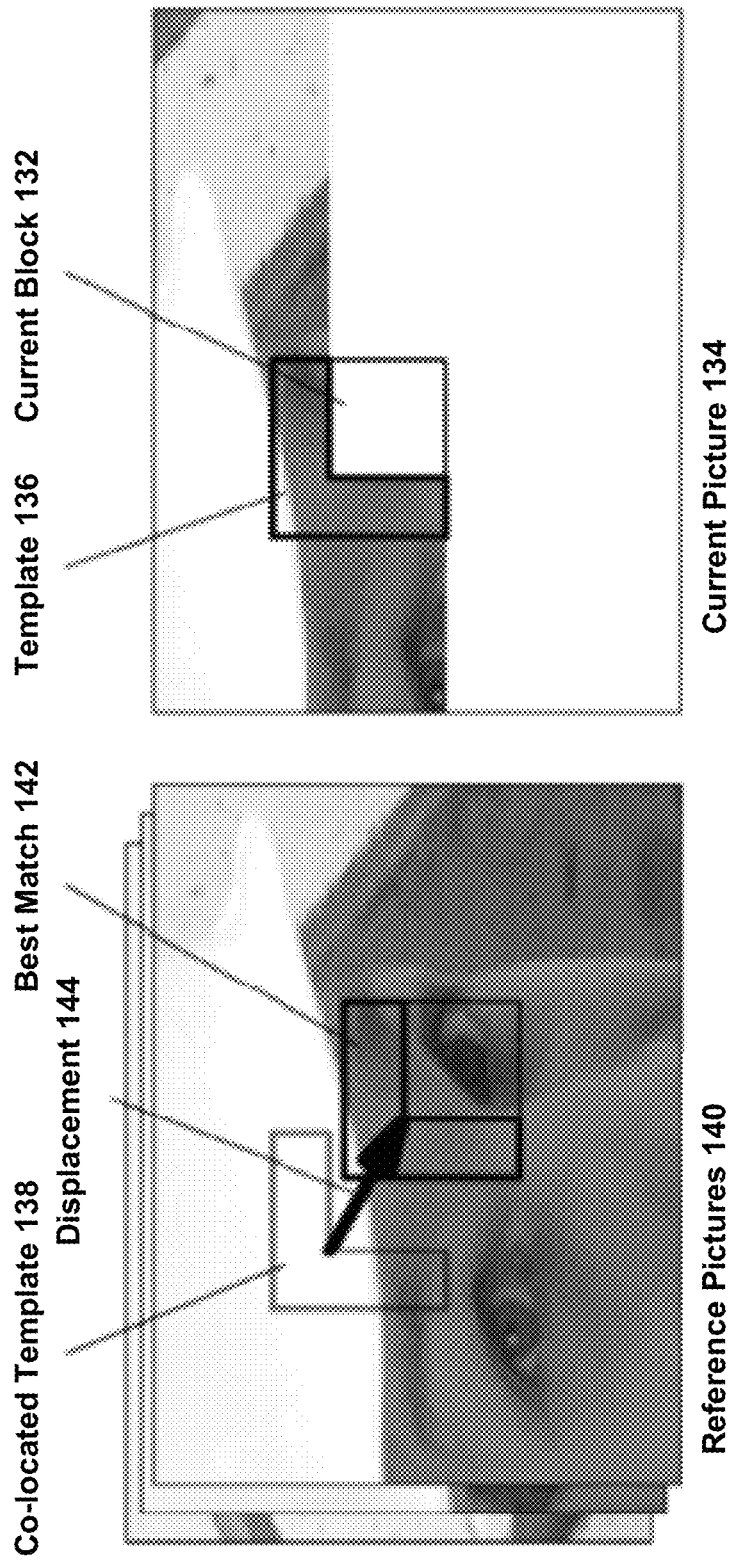
FIG. 6 is an illustration of an example L-shape template matching for decoder side motion vector derivation (DMVD).

FIG. 6 is an illustration of an example L-shape template matching for DMVD. In the example of FIG. 6, current block 132 of current picture 134 is inter predicted using template matching. Template 136 defines a shape that covers already-decoded neighboring blocks of current block 132. A video decoder (e.g., video decoder 30) may, for example, first compare the pixel values included in the already-decoded neighboring blocks covered by template 136 to pixel values included in the already-decoded neighboring blocks covered by co-located template 138, which covers blocks located in a reference picture of reference pictures 140. The video decoder may then move the template to other locations in the reference picture and compare the pixel values covered by the template to the pixel values included in the already-decoded neighboring blocks covered by template 136.

Based on these multiple comparisons, the video decoder may determine a best match, such as best match 142 shown in the example of FIG. 6. The video decoder may then determine a displacement between the best match and the co-located template. This displacement (e.g. displacement 144 in FIG. 6) corresponds to the motion vector used to predict current block 132.

As illustrated in FIG. 6, when a block is coded in DMVD mode, the MV for the block is searched by video decoder 30, as opposed to being directly signaled to video decoder 30. The MV which leads to the minimal distortion by template matching is selected as the final MV for the block. To keep high coding efficiency, a certain number of template matches may be necessary for decoder 30 to select a candidate motion vector as the MV to decode the current block, which may increase decoding complexity.

To reduce decoding complexity in DMVD, a mirror based bi-directional MV derivation method was proposed in Y.-J. Chiu, L. Xu, W. Zhang, H. Jiang, "DECODER-SIDE MOTION ESTIMATION AND WIENER FILTER FOR HEVC", VCIP workshop 2013, Malaysia, 17-20 Nov. 2013.

Figure 7:
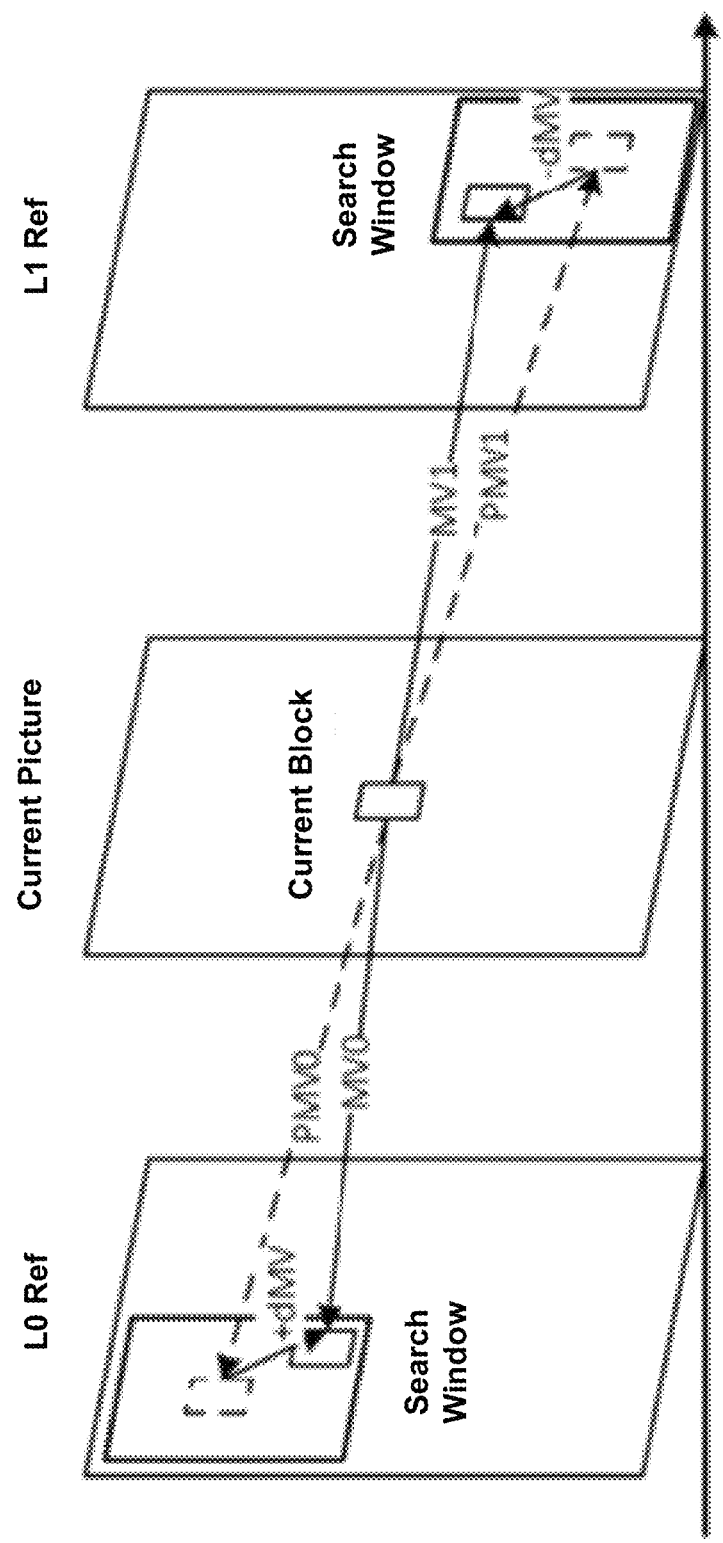
FIG. 7 is a conceptual diagram illustrating an example mirror based bi-directional MV derivation.

FIG. 7 is a conceptual diagram illustrating an example mirror based bi-directional MV derivation. As illustrated in FIG. 7, mirror based bi-directional MV derivation may be applied by centro-symmetric motion estimation around search centers in fractional sample accuracy at decoder side. The size/location of search window may be pre-defined and signaled in bitstream. In FIG. 7, dMV is an offset which is added to PMV0 and is subtracted from PMV1 to generate a MV pair, MV0 and MV1. All the values of dMV inside a search window may be checked and the Sum of Absolute Difference (SAD) between the L0 reference and the L1 reference blocks may be used as the measurement of centro-symmetric motion estimation. An MV pair with a minimum SAD may be selected as the final MVs for the block.

Techniques relating to adaptive motion vector resolution will now be discussed. Sub-pixel motion compensation is often more efficient than integer-pixel motion compensation. However, for some video content, such as texture content with very high frequency components or screen content, sub-pixel motion compensation shows no better or even worse performance. In such cases, it may be better to only have MVs and/or MVDs coded with integer-pixel precision.

As described in L. Guo, P. Yin, Y. Zheng, X. Lu, Q. Xu, J. Sole, "Adaptive motion vector resolution with implicit signaling," ICIP 2010: 2057-2060, adaptive MV resolution was proposed based on reconstructed residues (e.g., residual values). When the variance of the reconstructed residue block is above a threshold, video encoder 20 and video decoder 30 may determine to use quarter-pixel motion vector precision. Otherwise, video encoder 20 and video decoder 30 use half-pixel motion vector precision when coding motion vectors and MVDs.

As described in J. An, X. Li, X. Guo, S. Lei, "Progressive MV Resolution," JCTVC-F125, Torino, Italy, July 2011, MV resolution is adaptively determined based on the magnitude of signaled MV difference. As described in Y. Zhou, B. Li, J. Xu, G. J. Sullivan, B. Lin, "Motion Vector Resolution Control for Screen Content Coding", JCTVC-P0277, San Jose, US, January 2014, in some examples, video encoder 20 may be configured to signal motion vector precision information at the slice level.

In other examples, such as those described in US Patent Publication No. 2015/0195562, video encoder 20 may be configured to conditionally signal MV precision information using one or more of the following techniques.

As discussed above, in some examples, a decoder side motion vector precision derivation method is proposed for screen content. In this example, motion vector precision may be dependent on the result of template matching at video decoder 30. When a template matching result of an integer-pixel position and that of its neighboring sub-pixel position are quite different (e.g., greater than some threshold distance), the related region may be regarded as screen content and video decoder 30 may decode MVs with integer-pixel precision. Otherwise, video decoder 30 may be configured to use sub-pixel motion vector precision. To define "quite different," one or more fixed or adaptive thresholds may be used.

Video decoder 30 may, for example, decode video data by determining a motion vector precision based on template matching. In such an example, video decoder 30 may, for a current block being coded, identify an integer pixel position of an already coded neighboring block and, based on a location of the integer pixel position, apply a template to determine a plurality of integer pixel positions. Video decoder 30 may also apply the template to a plurality of sub-pixel positions to determine a plurality of sub-pixel positions. The template may, for example, define a shape, and video decoder 30 may apply the template to video data to determine the plurality of integer pixel positions by locating the plurality of integer pixel positions based on a location of the shape relative to the current block. Similarly, video decoder 30 may apply the template to the video data to determine the plurality of sub-pixel positions by locating the plurality of sub-pixel pixel positions based on a location of the shape relative to the current block.

Video decoder 30 may compare one or more pixel values for the plurality of integer pixel positions to one or more pixel values for the plurality of sub-pixel positions and, based on the comparison, determine a motion vector precision for a motion vector. Video decoder 30 may decode the current block using the motion vector. Video decoder 30 may, for example, determine the motion vector using a merge mode, an AMVP mode, or some other such mode.

Video decoder 30 may determine the motion vector precision for the motion vector by comparing one or more pixel values for the plurality of integer pixel positions to one or more pixel values for the plurality of sub-pixel positions to determine a difference value that corresponds to an amount of difference in pixel values between the one or more pixel values for the plurality of integer pixel positions and the one or more pixel values for the plurality of sub-pixel positions. In response to the difference value being greater than a threshold value, video decoder 30 determine the motion vector precision is integer pixel precision. In response to the difference value being less than a threshold value, video decoder 30 may determine the motion vector precision to be sub-pixel precision. The threshold value may be a fixed value, an adaptive value, or some other type of value. To compare the one or more pixel values for the plurality of integer pixel positions to the one or more pixel values for the plurality of sub-pixel positions, video decoder 30 may, for example, determining a sum of absolute differences between the one or more pixel values for the plurality of integer pixel positions and the one or more pixel values for the plurality of sub-pixel positions.

According to other techniques of this disclosure, the motion vector precision may be dependent on the properties (such as sharpness, gradient, or whether transform is skipped) of spatially neighboring block(s), temporally neighboring block(s), or both. The motion vector precision information may be derived video decoder 30. Alternatively or additionally, the motion vector precision may be dependent on the motion vector precision of spatially neighboring blocks, temporally neighboring blocks, or both.

Video decoder 30 may, for example, determine a motion vector precision based on neighboring block properties. The neighboring blocks may, for example, include at least one spatially neighboring blocks and/or at least one temporally neighboring blocks. For a current block being coded, video decoder 30 may locate one or more neighboring blocks and determine a property of the one or more neighboring blocks. The property may, for example, be one or more of a sharpness of the one or more neighboring blocks, a gradient of the one or more neighboring blocks, if one or more neighboring blocks were coded in a skip mode, and/or a motion vector precision of the one or more neighboring blocks. Based on the property of the one or more neighboring blocks, video decoder 30 may determine a motion vector precision for a motion vector and decode the current block using the motion vector. Video decoder 30 may, for example, determine without signaling (e.g. based on a context) which property or properties to determine, may always determine a fixed property or properties, or may receive an indication of which property or properties to determine.

In another example technique of this disclosure, video encoder 20 may signal an indicator in the bitstream (e.g., one or more syntax elements) which specify which decoder side motion vector precision method or methods are used. For example, video encoder 20 may signal the indicator in the bitstream directly and/or video decoder 30 may derive the value of the indicator from other information coded in bitstream, such as slice type and temporal level.

Video decoder 30 may, for example, receive in an encoded video bitstream, an indication of a motion vector precision signaling type and, based on the motion vector precision signaling type, determine a motion vector precision for a block of video data. Video decoder 30 may use a motion vector of the determined motion vector precision to locate a reference block for the block of video data. The motion vector precision signaling type may, for example, be one of (1) a template matching type as described above, (2) a neighboring block property-based type as described above, or (3) a direct signaling type as will be described in more detail below.

Video decoder 30 may, for example receive the indication of motion vector precision in a slice header, a sequence parameter set (SPS), a picture parameter set (PPS), or at some other level. The indication may, for example, be a slice type. In other words, video decoder 30 may determine a slice type for a particular slice and, based on that slice type, may determine a motion vector precision to use for decoding blocks of that slice. The indication may, for example, be a temporal level of a slice. In other words, video decoder 30 may determine a temporal level for a slice and, based on the temporal level of the slice determine a motion vector precision to use for the decoding blocks of the slice.

In another example, video encoder 20 may be configured to signal the motion vector precision information in the bitstream, such as at the largest coding unit LCU level, the CU level or the PU level. In other words, video encoder 20 may generate one or more syntax elements for inclusion in the bitstream of encoded video data, and video decoder 30 may parse those syntax elements to determine the motion vector precision for a particular block of video data. When a CU is indicated to have integer-precision MVs, all PUs inside this CU have integer motion vector precision.

In an example, for merge/skip mode, video decoder 30 may round a motion vector to an integer precision only when performing motion compensation. The un-rounded MV may be saved for MV prediction of later blocks. For example, video decoder 30 may determine a coding mode for a first block is a merge mode or a skip mode and determine a motion vector precision for the first block is integer pixel precision. Video decoder 30 may construct a merge candidate list for the first block that includes at least one fractional precision motion vector candidate. Video decoder 30 may select the fractional precision motion vector candidate to decode the first block and round the fractional precision motion vector candidate to determine an integer pixel precision motion vector. Video decoder 30 may locate a reference block for the first block using the integer pixel precision motion vector.

For a second block (e.g. a block coded based on information of the first block), video decoder 30 may add the integer precision motion vector candidate to a candidate list (e.g. a merge candidate list or an AMVP candidate list) for the second block. In other examples, however, video decoder 30 may add the fractional precision motion vector candidate to a candidate list for a second block.

For non-merge/skip inter mode, MV predictors may be rounded to integer precision, and the MVD may be signaled in integer precision so that rounded MV may be saved for later block MV prediction. Alternatively or in addition to, video encoder 20 and video decoder 30 may be configured to save a MV, before rounding, to later block MV prediction. In an example, for this case, the rounding may be performed for motion compensation only. Alternatively or in addition to, a rounded MV may be used in motion compensation and may be saved for later block MV prediction.

For example, video decoder 30 may determine that a coding mode for a first block is other than a merge mode and determine that a motion vector precision for the first block is integer pixel precision. Video decoder 30 may determine a fractional precision MVP for the first block and round the fractional precision MVP to determine an integer pixel precision MVP for the first block. Video decoder 30 may determine an MVD for the first block that is integer pixel precision. Video decoder 30 may determine an integer pixel precision motion vector based on the integer pixel precision MVP and the fractional precision MVD. Video decoder 30 may locate a reference block for the first block using the integer pixel precision motion vector.

Video decoder 30 may, for example, determine the fractional precision MVP for the first block by constructing an AMVP candidate list for the first block. The AMVP candidate list may include a fractional precision motion vector candidate. Video decoder 30 may select the fractional precision motion vector candidate as the fractional precision MVP for the first block. Video decoder 30 may add the fractional precision motion vector candidate to a candidate list for a second block that is to be predicted using information of the first block.

Alternatively or additionally, in an example, MVD precision information may be signaled, and sub-pixel precision MV may always be used, in some examples. The MVD precision may be signaled at the LCU level, at the CU level, or at the PU level. In one example, when a PU (or CU) is indicated to have integer-precision MVD, the PU (or all PUs inside this CU) may have integer MVD precision. For AMVP coded PUs, MVD of the PUs may have integer-pixel precision, while predicted MV and MV of the PU may have sub-pixel precision. Thus, adding an integer precision MVD to a sub-pixel precision MVP results in a sub-pixel motion vector.

For example, video decoder 30 may determine that an MVD precision for a first block is integer pixel precision. Video decoder 30 may construct a candidate list (e.g. and AMVP candidate list) of MVPs for the first block that includes at least one fractional precision motion vector candidate. Video decoder 30 may select from the candidate list the fractional precision motion vector candidate and determine a fractional pixel precision motion vector based on the fractional precision motion vector candidate and the integer pixel precision MVD. Video decoder 30 may locate a reference block for the first block using the fractional pixel precision motion vector.

In another example, the motion vector precision flag may be partially applied to an LCU or a CU. For example, the CU integer precision flag is not applied to its PUs which are coded with predefined coding modes, such as merge and skip, or with predefined partitions, such as non-2N×2N partitions, or with special coding tool, such as transform skip or no residues.

In one example, video decoder 30 may determine a default motion vector precision for video data and, in response to a PU of the video data being coded in a special mode, locate a reference block for the PU using a motion vector of the default motion vector precision. The special mode may, for example, be one or more of a skip mode, a 2N×2N merge mode, a merge mode, a transform skip mode, or an asymmetric partitioning mode. In response to a second PU of the video data being coded using modes other than a special mode, video decoder 30 may determine for the second PU of the video data, a signaled motion vector precision and locate a reference block for the second PU using a motion vector of the signaled motion vector precision. Video decoder 30 may determine for a CU of the video data, a signaled motion vector precision that is different than the default motion vector precision. The CU may, for example, include the PU and/or the second PU. In one example, the signaled motion vector precision may be integer pixel precision while the default motion vector precision is a fractional motion vector precision. In other examples, the default motion vector precision may be a fractional motion vector precision.

In one example, video encoder 20 may be configured to encode and signal MV/MVD precision information for only the PU or CU that has a non-zero MVD. When MV/MVD precision information is not signaled, video decoder 30 may be configured to use sub-pixel MV precision for the PU or CU. Video encoder 20 may be configured to signal MV/MVD precision information after encoding and signaling the MVD of a PU or CU. In some examples, an MVD equal to zero may indicate that both the vertical component of the MVD and the horizontal components of the MVD are equal to 0.

As one example, for a current block of video data, video decoder 30 may receive one or more syntax elements indicating the MVD value. In response to the MVD value being equal to zero, video decoder 30 may be configured to determine that a motion vector for the current block has sub-pixel motion vector precision. The MVD value being equal to zero may indicate that both an x-component of the MVD value and a y-component of the MVD value are equal to zero.

For a second current block of video data, video decoder 30 may receive one or more syntax elements indicating a second MVD value and, in response to the second MVD value being a non-zero value, receive an indication of a motion vector precision for a second motion vector for the second current block. Video decoder 30 may locate, in a reference picture, a reference block for the second current block using the second motion vector. For the second current block, video decoder 30 may receive the indication of the motion vector precision after receiving the second MVD value.

When MV/MVD precision information is signaled at the PU level, video encoder 20 may be configured to not signal the MV/MVD precision information if one or more (e.g., any) of the following conditions are true: (1) the PU is coded with merge/skip mode, (2) the PU is coded with AMVP mode, and MVD in each prediction direction of the PU is equal to zero, or (3) alternatively or additionally, if one CU could contain intra coded PUs and inter coded PUs together, which is disallowed in HEVC/When the PU is intra coded, the signaling of MV/MVD precision information at PU-level is skipped.

Video decoder 30 may, for example, receive, for a first block of video data (e.g. a first PU), one or more syntax elements indicating first motion vector precision information. In response to a second block of video data meeting a condition, video decoder 30 may determine second motion vector information to correspond to a default motion vector precision. In one example, the condition may be the second block being coded using merge mode or skip mode. In another example, the condition may be the second block being coded using AMVP mode and an MVD for each prediction direction of the second block being equal to zero. The default precision may, for instance, be a fractional precision in some examples or an integer precision in other examples. The first and second motion vector precision information may, for example, be one or both of a motion vector precision or an MVD precision.

When MV/MVD precision information is signaled at the CU level, the MV/MVD precision information may not be signaled if one (and possibly one or more) of the following conditions is true for all PUs within the CU: (1) the PU is intra coded, (2) the PU is coded with merge/skip mode, or (3) the PU is coded with AMVP mode, and MVD in each prediction direction of the PU is equal to zero. Alternatively or additionally, when motion vector precision information is not signaled, a default motion vector precision, such as integer motion vector precision, may be used for the PU or CU.

Video decoder 30 may, for example, receive, for a first CU of video data, first motion vector precision information and, in response to a second CU of the video data meeting a condition, determine second motion vector information to correspond to a default precision. The condition may, for example, be that all PUs within the CU are intra coded, all PUs within the CU are coded using merge mode or skip mode, all PUs within the CU are coded using AMVP and a MVD for each direction of all PUs being equal to zero. The default precision may, for example, be fractional precision or may be no precision. For example, if a block is intra predicted, then the block has no associated motion vector and, hence, no associated motion vector precision. The first and second motion vector precision information may, for example, include one or both of motion vector precision or MVD precision.

When current AMVP coded PU is signaled/derived as with integer-pixel motion vector precision, one or more (and in some examples, all) MV candidates from spatial neighboring blocks, temporal neighboring blocks, or both may be rounded to integer-pixel precision before pruning in generation process of AMVP list. When integer-pixel MV is signaled/derived to be used for a current merge, skip-coded CU/PU, or both, one or more (and in some examples, all) MV candidates from spatial temporal neighboring blocks, temporal neighboring blocks, or both, may be rounded to integer-pixel precision before pruning in generation process of merge list.

For example, video decoder 30 may identify one or more motion vector candidates for inclusion in a candidate list (e.g. a merge candidate list or an AMVP candidate list) for a block. The one or more motion vector candidates may, for example, include, one or more spatial neighboring candidate and/or one or more temporal neighboring candidates. The one or more motion vector candidates may include at least one fractional precision motion vector candidate. In response to a motion vector precision for the block being integer pixel precision, video decoder 30 may round the one or motion vector candidates to determine one or more integer precision motion vector candidates. Video decoder 30 may perform a pruning operation on the one or more integer precision motion vector candidates.

In an example, the motion vector precision flag may be used (or conditionally used) as CABAC contexts of other syntax elements. That is, different context models, depending on the motion vector precision flag, may be used to code certain syntax element. In one example, when coding an AMVP candidate index for a block such as PU, the motion vector precision flag(s) of a PU or an associated CU or spatially neighboring blocks or temporally neighboring blocks is (are) used as the CABAC coding context(s). Alternatively or additionally, in some examples, the initialized probability of AMVP candidate index being equal to 0 may be set close to 1 when motion vector precision flag indicating the integer-pixel motion vector precision. Alternatively or additionally, in some cases, such as only in B slices, or only when the slice is at a certain temporal level, or when the quantization parameter is larger than a predefined threshold, the motion vector precision flag may be used as CABAC contexts for other syntax elements, such as AMVP candidate index.

One or more of these examples may be combined. For example, in practice, any combination of any part of the example may be used as new example. Additionally, sub-examples of the above examples, are discussed below.

Some examples relate to decoder side motion vector precision derivation for screen content. In one example, L-shape or other-shape template matching on reconstructed samples may be used. The motion vector precision may be based on the difference between template matching result, such as SAD, of an integer-pixel position and the matching result of its neighboring sub-pixel position. For example, when the matching result of integer-pixel position is much lower, integer-pixel precision applies. Otherwise, sub-pixel precision applies. To define "much lower," a threshold may be used. In practice, fixed threshold, adaptive threshold, or both may be used. For an adaptive threshold, the adaptive threshold may be signaled in the bitstream or derived based on other information, such as block type, or QP, signaled in bitstream. In addition, a threshold for a "much higher" case may also be defined. Consequently, when the matching result of integer-position minus that of neighboring sub-pixel position is higher than the "much higher" threshold, quarter-pixel precision may be used. When the matching difference is between the thresholds of "much lower" and "much higher," half-pixel precision may be used. Alternatively or in addition, other template matching method, such as the mirror based bi-directional template matching, may be used instead in the above example.

In another example, the motion vector precision information may be derived at decoder side based on the property of spatially or temporally neighboring blocks, such as gradient, sharpness, or whether the transform is skipped for the blocks. Threshold information may be signaled in bitstream, derived from the bitstream, or both.

Some examples relate to indicator signaling. To adaptively fit for different contents, a combination of different methods of decoder side motion vector precision derivation (DMPD) may be used. To indicate which method or methods are in use, an indicator may be signaled in bitstream. In one example, the indicator may be signaled at slice level or above to explicitly tell decoder which DMPD method or methods will be used. In another example, the usage of some DMPD methods is signaled in bitstream while the usage of other DMPD methods is derived based on other information, such as slice type and temporal level of the slice, in bitstream.

Some examples relate to signaled adaptive motion vector precision. In such an example, motion vector precision may be signaled in bitstream such as at LCU, CU or PU level. A flag/value may be used to indicate the motion vector precision, such as integer precision, half-pixel precision, quarter-pixel precision, or other precisions. When motion vector precision is signaled for one block or one region/slice, all smaller blocks within this block/region/slice may share the same motion vector precision. Moreover, MVD information may also signaled in the signaled precision. Before motion compensation, MV (MV predictor+MVD) may be rounded to the signaled precision. The rounding may be toward positive infinity, negative infinity, zero, or infinity (negative value is rounded to negative infinity while positive value is rounded to positive infinity). Alternatively or in addition, MV predictor may be first rounded as mentioned above and then form the MV for a block. After motion compensation, the MV of the block is saved for MV prediction of later blocks. When saving the MV, the rounded MV may be saved, for example, to be used later as a merge candidate or AMVP candidate for a subsequently decoded block. Alternatively or in addition, the unrounded MV may be saved instead of the rounded motion vector, which may potentially keep the motion field more accurate.

In another example, motion vector precision information is not signaled for skip mode, 2N×2N merge mode, or both. In such an example, motion vector precision information might also not be signaled for a merged PUs. Alternatively or additionally, PUs which are coded in special coding modes, such as merge mode and skip mode, or with special partitions, such as asymmetric partitions, or with special transform depth or with transform skip, may keep default motion vector precision, such as quarter-pel, even when integer-precision MV is signaled at their CU level. Alternatively or additionally, other coded information, such as temporal level, QP, CU depth, may also be considered as a special coding mode or a special coding tool.

When entropy coding the motion vector precision information with CABAC, contexts other than the motion vector precision information in spatially neighboring blocks/CUs may be used to save line buffer, such as CU depth, PU partitioning, block size, temporal level and so on.

Pseudo code, syntax, and semantics of example MVD signaling for a block (e.g., PU) is shown below.

| | Descriptor |
|---|---|
| prediction_unit( x0, y0, nPbW, nPbH ) { | |
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       if( slice_type = = B ) | |
|         inter_pred_idc[ x0 ][ y0 ] | ae(v) |
|       if( inter_pred_idc[ x0 ][ y0 ] != Pred_L1 ) { | |
|         if( num_ref_idx_l0_active_minus1 > 0 ) | |

-continued

| | Descriptor |
|---|---|
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |
|       if( inter_pred_idc[ x0 ][ y0 ] != Pred_L0 ) { | |
|         if( num_ref_idx_l1_active_minus1 > 0 ) | |
|           ref_idx_l1[ x0 ][ y0 ] | ae(v) |
|         if( mvd_l1_zero_flag && | |
|           inter_pred_idc[ x0 ][ y0 ] = = Pred_BI ) { | |
|           MvdL1[ x0 ][ y0 ][ 0 ] = 0 | |
|           MvdL1[ x0 ][ y0 ][ 1 ] = 0 | |
|         } else | |
|           mvd_coding( x0, y0, 1 ) | |
|         mvp_l1_flag[ x0 ][ y0 ] | ae(v) |
|       } | |
|       if(nonZeroMvd_Exist) | |
|         mv_precision_flag[x0][y0] | ae(v) |
|     } | |
|   } | |
| } | |

| | Descriptor |
|---|---|
| mvd_remain_coding( x0, y0, refList ) { | |
|   abs_mvd_greater)_flag[ 0 ] | ae(v) |
|   abs_mvd_greater)_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | | abs_mvd_greater0_flag[0] and abs_mvd_greater0_flag[1] are one bin and share the same context.

abs_mvd_greater1_flag[0] and abs_mvd_greater1_flag[1] are one bin and share the same context.

abs_mvd_minus2[0] and abs_mvd_minus2[1] are exponantial golomb code with parameter equal to 1.

Two example steps in MVD signaling process when arithmetic coding is used include binarization and context model selection. For example, in HEVC, one component of MVD value is decomposed (binarized) as abs_mvd_greater0_flag, abs_mvd_greater1_flag, abs_mvd_minus2, and mvd_sign_flag. The value of abs_mvd_minus2 is furthered binarized by using exponantial golomb code with parameter equal to 1.

The current example techniques for MVD signaling may have the following problems. MVD signaling techniques, such as binarization and context modeling for context-adaptive arithmetic coding, may be inefficient for some motion vectors or MVDs, as the binarization and contexts are not based on different formats for coding motion vectors and MVDs, including motion vector precision. Different motion vector precisions may have different statistics on the amplitudes of resulting MVDs. Even with the same motion precision, the statistics with different coding modes, such as affine or conventional inter mode (for translational motion) may be different. Taking such information into consideration may bring additional coding gains.

This disclosure proposes to use two or more MVD coding (e.g., signaling) techniques to better represent MVD in the bitstream. In one example, the techniques used for coding the MVD of a block of video data may be dependent on the motion precision, and/or POC difference between a currently coded block and a reference picture, or any other already coded/decoded information of the block.

The itemized techniques may be performed by video encoder 20 and/or video decoder 30 individually or in any combination. In one example, this disclosure describes that video encoder 20 and/or video decoder 30 may be configured to apply two or more different MVD coding techniques to encoded and decode MVDs, respectively.

In one example, video encoder 20 may be configured to encode a block of video data according to an inter-prediction mode (e.g., an AMVP inter-prediction mode). As part of encoding the block of video data according to AMVP, video encoder 20 may be configured to determine an MVD associated with the block of video data. As will be described in more detail below, video encoder 20 may be further configured to determine an MVD coding technique from two or more MVD coding techniques, and encode one or more syntax elements indicating the MVD using the determined MVD coding technique. Likewise, video decoder 30 may be configured to receive an encoded block of video data, receive one or more syntax elements indicating an MVD associated with the encoded block of video data, determine an MVD coding technique from two or more MVD coding techniques, decode the one or more syntax elements indicating the MVD using the determined MVD coding technique, and decode the encoded block of video data using the decoded MVD.

In one example of the disclosure, the one or more syntax elements used to indicate the MVD may include abs_mvd_greater0_flag[x], abs_mvd_greater1_flag[x], abs_mvd_minus2[x], and mvd_sign_flag[x], where [x] specifies either the horizontal or vertical component of the MVD (e.g., [0] for the horizontal component and [1] for the vertical component). The value of syntax element abs_mvd_greater0_flag[x] indicates whether or not the absolute value of the MVD for a specific horizontal or vertical component is greater than zero. The value of syntax element abs_mvd_greater1_flag[x] indicates whether or not the absolute value of the MVD for a specific horizontal or vertical component is greater than one. Note that the syntax element abs_mvd_greater1_flag[x] is only coded if the value of the corresponding abs_mvd_greater0_flag[x] indicates that the absolute value of the component of the MVD is greater than zero. The value of abs_mvd_minus2[x] indicates the absolute value of the MVD for a specific horizontal or vertical component. Note that the syntax element abs_mvd_minus2[x] is only coded if the value of the corresponding abs_mvd_greater1_flag[x] indicates that the absolute value of the component of the MVD is greater than one. The value of the syntax element mvd_sign_flag[x] indicates the polarity (e.g., positive or negative) or each component of the MVD. The above is one example of how MVDs may be coded. Of course, other groups of syntax elements may be used to code an MVD.

In one example the disclosure, video encoder 20 and/or video decoder 30 to be configured to apply two or more different binarization methods for MVD coding/signaling. In one example, video encoder 20 and/or video decoder 30 may be configured to determine a particular binarization method, from among two or more binarization methods, for coding the one or more syntax elements indicating the MVD.

In one example of the disclosure, the binarization methods for the one or more syntax elements indicating the MVD employed by may include, but are not limited to an Exp-Golomb Code, a unary code, a fixed length code, or the like. In one example, video encoder 20 and/or video decoder 30 may apply one binarization method, but with different parameters. For example, the binarization method is defined as the K-the Exp-Golomb binarization method, where the parameter K may be different within one slice, tile, and/or picture.

In accordance with an example where the two or more binarization techniques include Kth order exponential-Golomb coding, video encoder 20 may be configured to determine the value of the parameter K for the Kth order exponential-Golomb coding used for binarization based on characteristics of one or more of a slice, tile, or picture. In some examples, the value of the parameter K may be signaled to video decoder 30. In other examples, video decoder 30 may be configured to determine the value of K for the Kth order exponential-Golomb coding used for binarization based on characteristics of one or more of a slice, tile, or picture.

In one example of the disclosure, video encoder 20 and/or video decoder 30 may determine the binarization method based on block size, motion vector precision used for the MVD, a motion model (e.g. affine motion vs translational motion), inter prediction direction, reference picture, POC difference between current picture and the a reference picture, motion vector or motion vector difference of neighboring blocks, intra/inter mode decision of neighboring blocks, and/or a motion predictor characteristic (non-scaled vs scaled, spatial vs temporal).

In another example of the disclosure, video encoder 20 and video decoder 30 may be configured to determine the binarization of the one or more syntax elements indicating the MVD based on an MVD precision. Video encoder 20 and/or video decoder 30 may binarize the abs_mvd_minus2[x] sytnax element with a relatively lower order exponential Golomb code (e.g., Golomb parameter equal to 1) when a relatively higher MVD precision is applied (e.g., ¼ pixel precision). Video encoder 20 and/or video decoder 30 may binarize the abs_mvd_minus2[x] synatx element with a relatively higher order exponential golomb code (e.g., Golomb parameter equal to 2) when lower MVD precision is applied (e.g., integer pixel or multiple pixels precision).

In another example, video encoder 20 and video decoder 30 may be configured to determine a binarization technique from the two or more binarization techniques based on a motion vector precision and/or a POC distance between the encoded block of video data and a reference picture associated with the encoded block of video data. Examples where POC distance are discussed below in the example implementation. In an example using motion vector precision, video encoder 20 and video decoder 30 may be configured to determine that the motion vector precision for the block of video data is a one-quarter pixel precision, and determine that a syntax element indicating an absolute value of the MVD minus two is binarized with an exponential Golomb code with a parameter of 1. Video encoder 20 and video decoder 30 may be further configured to determine that the motion vector precision for the encoded block of video data is an integer pixel precision, and determine that a syntax element indicating an absolute value of the MVD minus two is binarized with an exponential Golomb code with a parameter of 2.

In another example of the disclosure, video encoder 20 and/or video decoder 30 may apply two or more sets of CABAC contexts to the one or more syntax elements indicating the MVD syntax (e.g., for signaling and/or parsing). In one example, video encoder 20 and/or video decoder 30 may be configured to determine a set of CABAC contexts, from among two or more sets of CABAC contexts, for coding the one or more syntax elements indicating the MVD. In one example, each set of CABAC contexts may include at least one context. In another example, different sets of CABAC contexts may have different numbers of contexts.

The condition of selecting one set of CABAC contexts may be dependent on block size, motion vector precision, motion model (affine motion vs translational motion), inter prediction direction, reference picture, POC difference between current picture and the reference picture, motion vector or motion vector difference on neighboring blocks, intra/inter mode decision of neighboring blocks, or a motion predictor characteristic (non-scaled vs scaled, spatial vs temporal). In one example, video encoder 20 and video decoder 30 may be configured to determine the set of contexts from the two or more sets of contexts based on a motion vector precision and/or a POC distance between the encoded block of video data and a reference picture associated with the encoded block of video data.

In another of the disclosure, video encoder 20 and/or video decoder 30 may separate MVD signaling into two or more parts, and other syntax elements may be coded between (among) the separated parts for MVD signaling. In one example, the first part of a syntax element includes the signaling of indications of whether the horizontal and vertical components of the MVD are equal to 0, wherein video encoder 20 and video decoder 30 may code (e.g., encode and decode, respectively) two syntax elements for each component of MVD. In another example, the first part may include three syntax elements. A first syntax element indicates whether or not an MVD is a zero MVD, and the other two syntax elements to indicate whether each component (e.g., horizontal or vertical component) of MVD is equal to 0 or not.

In another example, at least one part of MVD information (e.g., at least one syntax element indicating some part of the MVD) is signaled/coded before syntax element(s) indicating MV precision information are signaled. In another example, the part of the MVD information that is signaled before the MV precision information is used by video decoder 30 to determine the MV precision information. The remaining part of MVD information is signaled after the MV precision information. The signaling of the remaining part can be dependent on the MV precision information as described in previous examples.

In another example, at least one part of the MVD information (e.g., at least one syntax element indicating some part of the MVD) is signaled/coded before syntax element(s) indicating the MV Predictor (MVP) index. In another example, when the first part of the MVD information, including indications of zero MVD, is coded with zero MVD, the MVP index may be skipped (i.e., the MVP index is not signalled/code). In this case, the MVP index is always set to 0. In another example, video decoder 30 may be configured to derive the MVP index without signaling (e.g., without receiving a signaled syntax element for the MVP index). The derivation may be based on the priority of MV predictors, and/or on reconstructed neighboring samples. In another example, the techniques above may be applied under certain conditions, for example, when the MV precision information is conditionally signaled based on an MVD, as in US Patent Publication No. 2015/0195562.

In accordance with the above described techniques, video encoder 20 and video decoder 30 may be configured to code the one or more syntax elements indicating the MVD using the determined MVD coding technique in two or more parts. In another example, encoder 20 and video decoder 30 may be configured to code a first syntax element indicating whether a horizontal component of the MVD is zero, and code a second syntax element indicating whether a vertical component of the MVD is zero.

The set of the multiple coding techniques described above for MVD signaling may be pre-defined. In other examples, the sets of techniques to be used may be signaled in sequence parameter set, and/or picture parameter set, and/or slice header.

One example implementation of syntax elements and semantics for the techniques of this disclosure is shown below.

| | Descriptor |
|---|---|
| prediction_unit( x0, y0, nPbW, nPbH ) { | |
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       if( slice_type = = B ) | |
|         inter_pred_idc[ x0 ][ y0 ] | ae(v) |
|       if( inter_pred_idc[ x0 ][ y0 ] != Pred_L1 ) { | |
|         if( num_ref_idx_l0_active_minus1 > 0 ) | |
|           ref_idx_l0[ x0 ][ y0 ] | ae(v) |
|         mvd_gr0_coding( x0, y0, 0 ) | |
|         mvp_l0_flag[ x0 ][ y0 ] | ae(v) |
|       } | |
|       if( inter_pred_idc[ x0 ][ y0 ] != Pred_L0 ) { | |
|         if( num_ref_idx_l1_active_minus1 > 0 ) | |
|           ref_idx_l1[ x0 ][ y0 ] | ae(v) |
|         if( mvd_l1_zero_flag && | |
|           inter_pred_idc[ x0 ][ y0 ] = = Pred_BI ) { | |
|           MvdL1[ x0 ][ y0 ][ 0 ] = 0 | |
|           MvdL1[ x0 ][ y0 ][ 1 ] = 0 | |
|         } else | |
|           mvd_gr0_coding( x0, y0, 1 ) | |
|         mvp_l1_flag[ x0 ][ y0 ] | ae(v) |
|       } | |
|       if(nonZeroMvd_Exist) | |
|         mv_precision_flag[x0][y0] | ae(v) |
|       if( inter_pred_idc[ x0 ][ y0 ] != Pred_L1 ) { | |
|         mvd_remain_coding( x0, y0, 0 ) | |
|       } | |
|       if( inter_pred_idc[ x0 ][ y0 ] != Pred_L0 ) { | |
|         mvd_remain_coding( x0, y0, 1 ) | |
|       } | |

| | Descriptor |
|---|---|
| mvd_gr0_coding( x0, y0, refList ) { | |
|   abs_mvd_greater0_flag[ 0 ] | ae(v) |
|   abs_mvd_greater0_flag[ 1 ] | ae(v) |
| } | |

| | Descriptor |
|---|---|
| mvd_remain_coding( x0, y0, refList ) { | |
|   if( abs_mvd_greater0_flag[ 0 ] ) | |
|     abs_mvd_greater1_flag[ 0 ] | ae(v) |

-continued

| | Descriptor |
|---|---|
| if( abs_mvd_greater0_flag[ 1 ] ) | |
|    abs_mvd_greater1_flag[ 1 ] | ae(v) |
| if( abs_mvd_greater0_flag[ 0 ] ) { | |
|    if( abs_mvd_greater1_flag[ 0 ] ) | |
|      abs_mvd_minus2[ 0 ] | ae(v) |
|    mvd_sign_flag[ 0 ] | ae(v) |
| } | |
| if( abs_mvd_greater0_flag[ 1 ] ) { | |
|    if( abs_mvd_greater1_flag[ 1 ] ) | |
|      abs_mvd_minus2[ 1 ] | ae(v) |
|    mvd_sign_flag[ 1 ] | ae(v) |
| } | |
| } | |

In this example implementation, there are 5 total contexts used in MVD coding. When the mv_precision flag is equal to 1 (e.g., one-quarter pixel precision) or when POC difference between the current picture and the reference picture is equal to 1, the following binarization and context modeling methods are applied.

The sytnax elements abs_mvd_greater0_flag[0] and abs_mvd_greater0_flag[1] are coded as one CABAC bin and share the same context with index ctxIdx=0.

The sytnax elements abs_mvd_greater1_flag[0] and abs_mvd_greater1_flag[1] are coded as one CABAC bin and share the same context with index ctxIdx=1

The syntax elements abs_mvd_minus2[0] and abs_mvd_minus2[1] are split into two portions. These syntax elements may be binarized according to an exponential Golomb code with parameter equal to 1. The binarization may include two parts: one unary code portion and one fixed length code portion. The length of the unary code and the fixed length code is defined by the parameter. The unary code portion may be coded with one or more multiple contexts. In one example, the unaray code of the exponential Golomb code is coded using a context with index ctxIdx=3.

Otherwise (i.e., a motion vector precision other than one-quarter pixel precision and a POC distance greater than one), the following techniques apply.

The syntax elements abs_mvd_greater0_flag[0] and abs_mvd_greater0_flag[1] are coded as one CABAC bin and share the same context with index ctxIdx=0.

The syntax elements abs_mvd_greater1_flag[0] and abs_mvd_greater1_flag[1] are coded as one CABAC bin and share the same context with index ctxIdx=2.

The syntax elements abs_mvd_minus2[0] and abs_mvd_minus2[1] are split into two portions. A first portion is coded using an exponantial Golomb code with parameter equal to 2. The section portion is coded using a unaray code of the exponential Golomb code using a context with index ctxIdx=4.

Figure 8:
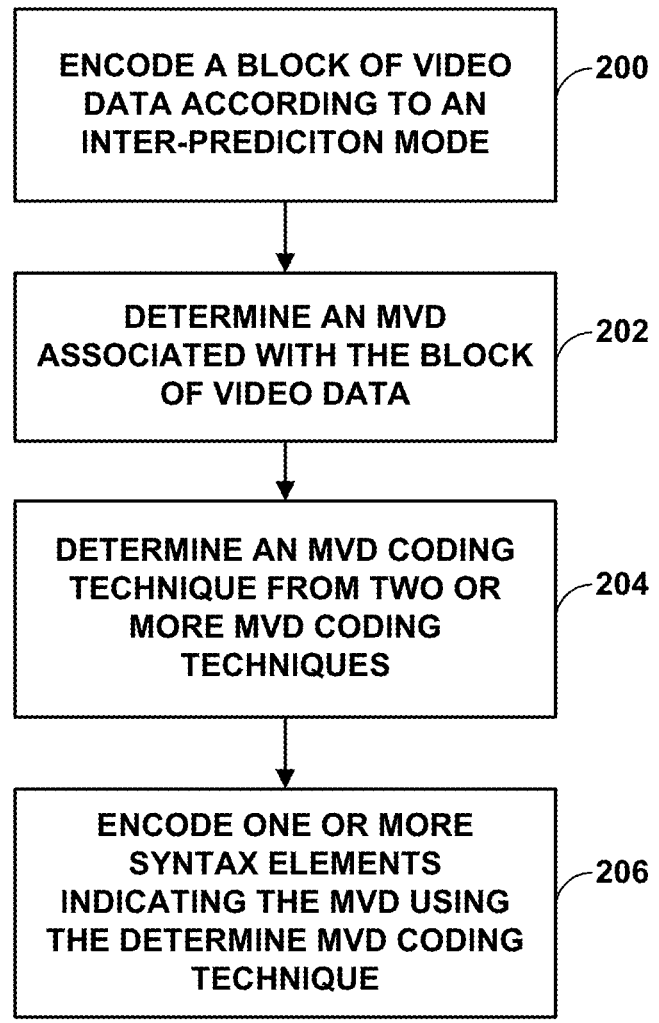
FIG. 8 is a flowchart illustrating an example encoding method according to the techniques of the disclosure.

FIG. 8 is a flowchart illustrating an example encoding method according to the techniques of the disclosure. The techniques of FIG. 8 may be performed by video encoder 20.

Video encoder 20 may be configured to encode a block of video data according to an inter-prediction mode (200), determine an MVD associated with the block of video data (202), determine an MVD coding technique from two or more MVD coding techniques (204), and encode one or more syntax elements indicating the MVD using the determined MVD coding technique (206).

Figure 9:
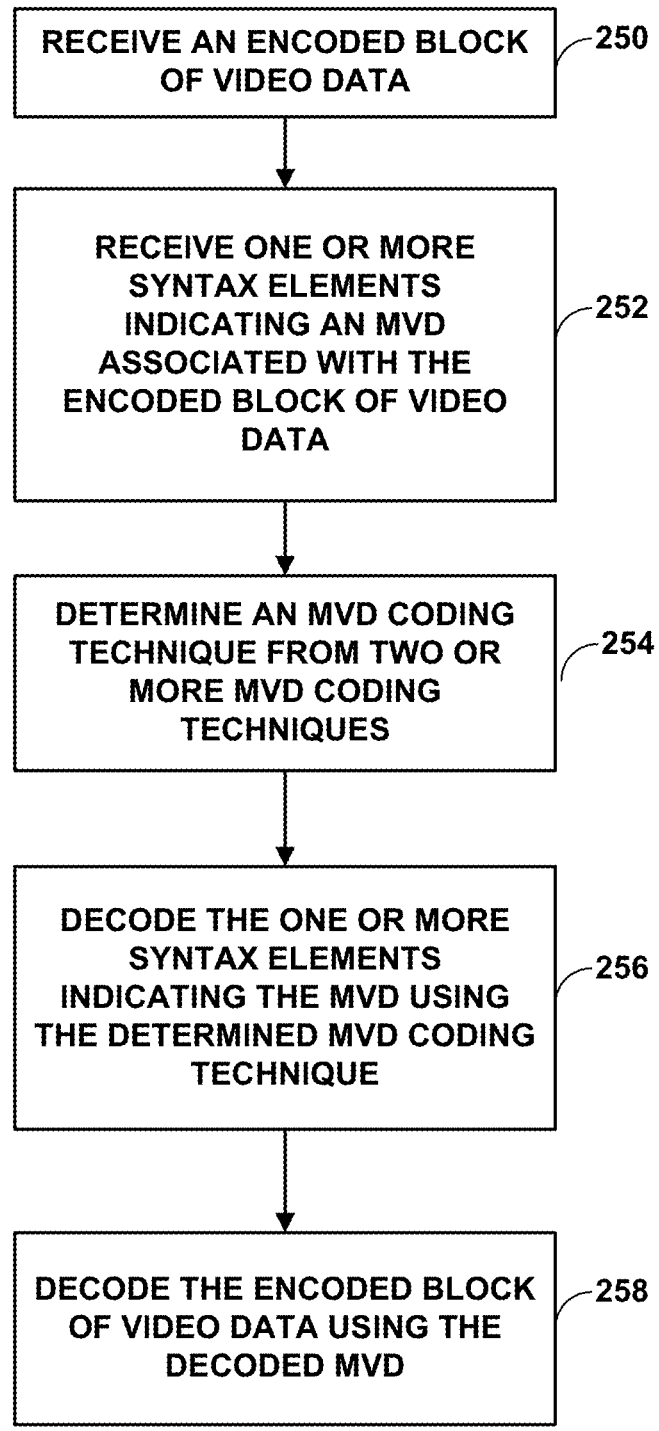
FIG. 9 is a flowchart illustrating an example decoding method according to the techniques of the disclosure.

FIG. 9 is a flowchart illustrating an example decoding method according to the techniques of the disclosure. The techniques of FIG. 9 may be performed by video decoder 30.

Video decoder 30 may be configured to receive an encoded block of video data (250), receive one or more syntax elements indicating an MVD associated with the encoded block of video data (252), determine an MVD coding technique from two or more MVD coding techniques (254), decode the one or more syntax elements indicating the MVD using the determined MVD coding technique (256), and decode the encoded block of video data using the decoded MVD (258).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving an encoded block of video data;
   receiving one or more syntax elements indicating a motion vector difference (MVD) associated with the encoded block of video data;
   determining a set of context models from two or more sets of context models used to entropy code the one or more syntax elements indicating the MVD, the set of context models being determined based on a motion model for the encoded block of video data being an affine motion model or a translational motion model;
   entropy decoding the one or more syntax elements indicating the MVD using the determined set of context models to determine a decoded MVD; and
   decoding the encoded block of video data using the decoded MVD.

2. The method of claim 1, wherein determining the set of context models from the two or more sets of context models used to entropy code the one or more syntax elements indicating the MVD comprises:
   determining the set of context models from the two or more sets of context models based on the motion model and one or more of a block size of the encoded block of video data, a motion vector precision used for the MVD, an inter prediction direction, a reference picture, a picture order count difference between the encoded block of video data and the reference picture, a motion vector of a neighboring block, an MVD of a neighboring block, intra/inter mode decision of neighboring blocks, or a motion predictor characteristic.

3. An apparatus configured to decode video data, the apparatus comprising:
   a memory configured to store an encoded block of video data; and
   one or more processors implemented in circuitry and in communication with the memory, the one or more processors configured to:
      receive an encoded block of video data;
      receive one or more syntax elements indicating a motion vector difference (MVD) associated with the encoded block of video data;
      determine a set of context models from two or more sets of context models used to entropy code the one or more syntax elements indicating the MVD, the set of context models being determined based on a motion model for the encoded block of video data being an affine motion model or a translational motion model;
      entropy decode the one or more syntax elements indicating the MVD using the determined set of context models to determine a decoded MVD; and
      decode the encoded block of video data using the decoded MVD.

4. The apparatus of claim 3, wherein to determine the set of context models from the two or more sets of context models used to entropy code the one or more syntax elements indicating the MVD, the one or more processors are configured to:
   determine the set of context models from the two or more sets of context models based on the motion model and one or more of a block size of the encoded block of video data, a motion vector precision used for the MVD, an inter prediction direction, a reference picture, a picture order count difference between the encoded block of video data and the reference picture, a motion vector of a neighboring block, an MVD of a neighboring block, intra/inter mode decision of neighboring blocks, or a motion predictor characteristic.

5. An apparatus configured to decode video data, the apparatus comprising:
   means for receiving an encoded block of video data;
   means for receiving one or more syntax elements indicating a motion vector difference (MVD) associated with the encoded block of video data;
   means for determining a set of context models from two or more sets of context models used to entropy code the one or more syntax elements indicating the MVD, the set of context models being determined based on a motion model for the encoded block of video data being an affine motion model or a translational motion model;
   means for entropy decoding the one or more syntax elements indicating the MVD using the determined set of context models to determine a decoded MVD; and
   means for decoding the encoded block of video data using the decoded MVD.

6. The apparatus of claim 5, wherein the means for determining the set of context models from the two or more sets of context models used to entropy code the one or more syntax elements indicating the MVD comprises:
   means for determining the set of context models from the two or more sets of context models based on the motion model and one or more of a block size of the encoded block of video data, a motion vector precision used for the MVD, an inter prediction direction, a reference picture, a picture order count difference between the encoded block of video data and the reference picture, a motion vector of a neighboring block, an MVD of a neighboring block, intra/inter mode decision of neighboring blocks, or a motion predictor characteristic.

7. A non-transitory computer-readable storage medium storing instructions that, when executed, cause one or more processors of a device configured to decode video data to:
   receive an encoded block of video data;
   receive one or more syntax elements indicating a motion vector difference (MVD) associated with the encoded block of video data;
   determine a set of context models from two or more sets of context models used to entropy code the one or more syntax elements indicating the MVD, the set of context models being determined based on a motion model for the encoded block of video data being an affine motion model or a translational motion model;
   entropy decode the one or more syntax elements indicating the MVD using the determined set of context models to determine a decoded MVD; and
   decode the encoded block of video data using the decoded MVD.

8. The non-transitory computer-readable storage medium of claim 7, wherein to determine the set of context models from the two or more sets of context models used to entropy code the one or more syntax elements indicating the MVD, the instructions further cause the one or more processors to:
determine the set of context models from the two or more sets of context models based on the motion model and one or more of a block size of the encoded block of video data, a motion vector precision used for the MVD, an inter prediction direction, a reference picture, a picture order count difference between the encoded block of video data and the reference picture, a motion vector of a neighboring block, an MVD of a neighboring block, intra/inter mode decision of neighboring blocks, or a motion predictor characteristic.

* * * * *